US012732717B2

(12) United States Patent
Van Der Tempel et al.

(10) Patent No.: US 12,732,717 B2
(45) Date of Patent: Sep. 8, 2026

(54) EFFICIENT IMAGE SENSOR

(71) Applicant: VoxelSensors SRL, Brussels (BE)

(72) Inventors: Ward Van Der Tempel, Keerbergen (BE); Christian Mourad, Genval (BE)

(73) Assignee: VoxelSensors SRL, Brussels (BE)

( * ) Notice: Subject to any disclaimer, the term of this patent is extended or adjusted under 35 U.S.C. 154(b) by 82 days.

(21) Appl. No.: 18/728,428

(22) PCT Filed: Jan. 19, 2023

(86) PCT No.: PCT/EP2023/051204
§ 371 (c)(1),
(2) Date: Jul. 11, 2024

(87) PCT Pub. No.: WO2023/143997
PCT Pub. Date: Aug. 3, 2023

(65) Prior Publication Data

US 2025/0159379 A1 May 15, 2025

(30) Foreign Application Priority Data

Jan. 27, 2022 (EP) .................................... 22153557

(51) Int. Cl.
*H04N 25/77* (2023.01)
*H04N 25/40* (2023.01)

(52) U.S. Cl.
CPC ............. *H04N 25/77* (2023.01); *H04N 25/40* (2023.01)

(58) Field of Classification Search
CPC ...... H04N 25/77; H04N 25/40; H04N 25/773; H04N 25/79; H04N 25/673; G06N 3/08; G06N 3/0675; G06N 3/049; G06V 10/14; G06V 10/82
See application file for complete search history.

(56) References Cited

U.S. PATENT DOCUMENTS

| | | | | |
|---|---|---|---|---|
| 6,011,295 A * | 1/2000 | Merrill | .................. | G06N 3/065 257/295 |
| 11,023,808 B1 | 6/2021 | Jiang | | |
| 2003/0076992 A1 | 4/2003 | Banish | | |
| 2006/0192086 A1 | 8/2006 | Niclass | | |

(Continued)

FOREIGN PATENT DOCUMENTS

WO 2021226411 A1 11/2021

OTHER PUBLICATIONS

Ara Shawkat, Mst Shamim, et al.: "Single Photon Avalanche Diode based Vision Sensor with On-Chip Memristive Spiking Neuromorphic Processing", 2020 IEEE 63rd International Midwest Symposium on Circuits and Systems (MWSCAS), IEEE, Aug. 9, 2020 (Aug. 9, 2020), pp. 377-380, p. 377-p. 378.

(Continued)

*Primary Examiner* — Jason A Flohre
(74) *Attorney, Agent, or Firm* — Morrison & Foerster LLP

(57) ABSTRACT

The present invention relates to an image sensor (1) for efficient optical sensing. The sensor (1) comprises a plurality of pixel sensors (3), each pixel sensor (3) comprising a photo detector (4), each pixel being adapted to output a digital signal. The sensor (1) further comprises processing means, for example a neural network (5), comprising a plurality of neurons (6). Each photo detector (4) is in the vicinity of said processing means. Furthermore, each photo detector (4) is connected to the processing means.

15 Claims, 9 Drawing Sheets

(56) References Cited

U.S. PATENT DOCUMENTS

| | | | | |
|---|---|---|---|---|
| 2008/0154815 | A1 | 6/2008 | Martinez | |
| 2014/0219497 | A1 | 8/2014 | Richert | |
| 2018/0278868 | A1* | 9/2018 | Dawson | H04N 23/80 |
| 2021/0264679 | A1* | 8/2021 | Liu | G06V 40/19 |
| 2021/0285821 | A1 | 9/2021 | Borremans | |
| 2021/0305295 | A1 | 9/2021 | Ion | |
| 2024/0380991 | A1* | 11/2024 | Jee | A61B 5/024 |

OTHER PUBLICATIONS

Saeed Afshar et al.: "Event-based Feature Extraction Using Adaptive Selection Thresholds", arxiv.org, Cornell University Library, 201 Olin Library Cornell University Ithaca, NY 14853, Jul. 18, 2019 (Jul. 18, 2019), abstract figure 1, p. 3.

Saeed Afshar, et al.: "Event-based Processing of Single Photon Avalanche Diode Sensors", arxiv.org, Cornell University Library, 201 Olin Library Cornell University Ithaca, NY 14853, Dec. 25, 2019 (Dec. 25, 2019), pp. 2-4.

Wu Q. X., et al.: "Processing visual stimuli using hierarchical spiking neural networks", Neurocomputing, Elsevier, Amsterdam, NL, vol. 71, No. 10-12, Jun. 1, 2008 (Jun. 1, 2008), pp. 2055-2068, [retrieved on Feb. 29, 2008] abstract p. 2064, figure 9.

Dong-Qing Zhang et al. (2009): "Temporally consistent caption detection in videos using a spatiotemporal 3D method",Image Processing (ICIP), 2009 16th IEEE International Conference On, IEEE, Piscataway, NJ, USA, Nov. 7, 2009 (Nov. 7, 2009), pp. 1881-1884.

International Preliminary Report on Patentability and Written Opinion dated Sep. 2, 2024, for PCT Application No. PCT/EP2023/051204, filed Jan. 19, 2023, twenty pages.

Matthieu Molinier et al. (2005). "3D-Connected Components Analysis for Traffic Monitoring in Image Sequences Acquired from a Helicopter", Jun. 28, 2005 (Jun. 28, 2005), SAT 2015 18th International Conference, Austin, TX, USA, Sep. 24-27, 2015; [Lecture Notes in Computer Science; Lect.Notes Computer], Springer, Berlin, Heidelberg, pp. 141-150.

* cited by examiner

EFFICIENT IMAGE SENSOR

CROSS REFERENCE TO RELATED APPLICATIONS

This application is a U.S. national stage application under 35 U.S.C. § 371 of International Application No. PCT/EP2023/051204, filed internationally on Jan. 19, 2023, which claims priority to EP Application Serial No. 22153557.8 filed Jan. 27, 2022.

TECHNICAL FIELD

The present invention relates to an image sensor and an optical sensing system comprising such an image sensor. In particular, the present invention relates to an image sensor and optical sensing system comprising such an image sensor for efficient optical sensing.

BACKGROUND

When imaging using traditional or AI based image signal processing units, power consumption is one of the most important parameters. Typically, photo detectors of said units detect impinging photons on a frame-based fashion. The higher the frame rate, the higher the overall power consumption. This is disadvantageous in case the impinging photons on a set of photo detectors remain the same from frame to frame, and over many consecutive frames. In this case, a higher frame rate results only in increasing the power consumption since the unit processes similar or the same frames repeatedly.

Another disadvantage is the power inefficiency due to the need of processing all photo detector outputs, regardless of whether or not there are detected photons. For example, it is needed to process photo detector outputs in both cases of logic '1' (e.g. photons detected, e.g. image information available) and logic '0' (e.g. no photons, e.g. no image information available). Therefore the absence of detection will also need to be processed, leading to an unnecessary power consumption.

Another disadvantage is the need for data busses for data transmission from photo detectors to processors. On top of that, there is need at the output of each photo detector for a quantizer with a predetermined resolution. The higher the resolution of said quantizer, the higher the power consumption needed per quantization. There is also the need for an analog-to-digital converter, and a random access memory. All these require space, but also result in an inefficient system due to the power loss in each of these components.

There is, therefore, a need for image sensors and optical sensing systems and signal processing units that are power efficient.

The present invention aims to resolve at least some of the problems mentioned above.

SUMMARY OF THE INVENTION

It is an object of embodiments of the present invention to provide an efficient image sensor and an optical sensing system comprising such image sensor. The above objective is accomplished by a device and method according to the present invention.

In a first aspect, the present invention relates to an image sensor for efficient optical sensing, comprising:

a plurality of pixel sensors, each pixel sensor comprising a photo detector adapted to output a logic signal, and a processing means characterized in that each photo detector is in the vicinity of said processing means, wherein each photo detector is connected, preferably directly connected, to the processing means.

It is an advantage of embodiments of the present invention that processing sensing information is done by a processing structure with massively parallel input connection to each of the pixel sensors, for example implemented using a neural network, instead of a conventional processor with serialized data and instructions. For the sake of readability we will use the neural network as the main example implementation in the remainder of the description, however the invention is applicable to a generalization of extremely parallelized compute with a dedicated connection to each of the pixel sensors in the array. For example, wherein said processing means is at least one neural network, comprising a plurality of neurons, wherein each photo detector is in the vicinity of at least one corresponding neuron thereto, wherein each photo detector is connected, preferably directly connected, to the at least one corresponding neuron thereto.

It is an advantage of embodiments of the present invention that processing sensing information is done at a much faster rate, with a much less power, compared to a conventional processor.

It is an advantage of embodiments of the present invention that the need for a conventional processor is eliminated.

It is an advantage of embodiments of the present invention that the need for an analog-to-digital converters (ADCs) is eliminated. It is an advantage of embodiments of the present invention that the need for a conventional random access memory (RAM) is eliminated.

It is an advantage of embodiments of the present invention that a power efficient optical sensing system is obtained.

It is an advantage of embodiments of the present invention that limitations of optical signal processors, for example such as limitations of frame-based imaging (e.g. having to process similar or the same frame repeatedly, which is power inefficient), are overcome.

It is an advantage of embodiments of the present invention that a power efficient optical sensing system is obtained due to processing optical data using said network only when said detector detects impinging photons.

It is an advantage of embodiments of the present invention that a compact system is obtained. It is an advantage of embodiments of the present invention that the need for a long and/or wide bus for data transmission or extremely high speed serialized link between each detector and its corresponding neuron in the network is eliminated.

It is an advantage of embodiments of the present invention that intermediate components between detectors and neurons are avoided, therefore increasing the power efficiency of the system. It is an advantage that power efficient and simple connections are obtained.

It is an advantage of embodiments of the present invention that the outputs of the detector are processed simultaneously by the corresponding neurons. It is an advantage of embodiments of the present invention that efficient and fast data processing using the network is obtained.

Preferred embodiments of the first aspect of the invention comprises one or a suitable combination of more than one of the following features.

The photo detector is a single photon detector, preferably a single-photon avalanche diode (SPAD). It is an advantage of embodiments of the present invention that SPADs are acting as quantizers, which eliminates the need for additional quantizers. It is an advantage of embodiments of the present invention that intensity data (as well as change of intensity data) of impinging photons on said diode are coded in the time-domain of the output of said diode.

The distance between each detector and the corresponding neuron thereto is preferably at most 100 micrometer, preferably at most 50 micrometer, more preferably at most 25 micrometer, and most preferably 10 micrometer. It is an advantage of embodiments of the present invention that a short and almost immediate connection between each detector and its corresponding neuron is obtained.

The plurality of pixel sensors may be stacked on the plurality of neurons. It is an advantage of embodiments of the present invention that the shortest connection between said pixel sensors and said neurons is obtained. It is an advantage of embodiments of the present invention that the need for a long bus for data transmission between the pixel sensors and the neurons is eliminated. It is an advantage of embodiments of the present invention that, although the connections between said pixel sensors and said neurons are fixed, the weights at each neuron are configurable and reconfigurable.

Each neuron may be connected to at least one neighbouring neuron, wherein each neuron is capable of producing an output based on input signals of the at least one neighbouring neuron, as well as the output of said detector. It is an advantage of embodiments of the present invention that a more accurate detection is obtained. It is an advantage of embodiments of the present invention that false positive detection and noise are filtered out and reduced.

Each neuron is preferably capable of producing an output based on current inputs to said neuron as well as current state of said neuron. It is an advantage of embodiments of the present invention that a possible upcoming detection is predicted. It is an advantage of embodiments of the present invention that the network has a memory-like behavior.

The network is preferably adapted to be responsive to a train of pulses. It is an advantage of embodiments of the present invention that said single detector output (train of pulses or spikes) is compatible with said neural network input. It is an advantage of embodiments of the present invention that there is no need for converting the output of said detector to be accepted by said neural network.

The neural network is advantageously a spiking neural network. It is an advantage of embodiments of the present invention that an efficient neural network is used, so as to obtain a power efficient optical sensing system. It is an advantage of embodiments of the present invention that a faster optical sensing rate is obtained using spiking neural networks. It is an advantage of embodiments of the present invention that said network is compatible with the output of the detectors.

In a second aspect, the present invention relates to an optical sensing system comprising an image sensor according to the first aspect, and optics able to produce an image of a scene on said image sensor.

Preferred embodiments of the second aspect of the present invention comprises one or a suitable combination of more than one of the following features:

- the system further comprises at least one light source, wherein said light source is adapted to illuminate a dot on a scene, wherein said light source comprises means adapted to scan said dot on the scene, preferably continuously,
- said network is trained to extract features of a set of input signals to said network,
- said features are mass, density, motion, and/or proximity of objects in a scene.

In a third aspect, the present invention relates to a method for extracting features of a scene using the optical sensing system according to the second aspect, comprising the steps of:

- adapting said neural network to receive a train of pulses,
- adjusting an activation level of a neuron based on said train of pulses,
- adapting said neuron to produce an output signal once said activation level exceeds a threshold value,
- propagating said output signal to at least one neuron in a subsequent layer of said network, and
- extracting features of output signals of said network.

Preferred embodiments of the third aspect of the present invention comprises one or a suitable combination of more than one of the following features:

- the method further comprises the step of determining the depth profile of a field of view, said determining step comprises the steps of:
  - a) projecting by means of said light source at least one light pattern onto the field of view, the projection occurring in a time window of less than 10 μsec, preferably less than 1 μsec;
  - b) imaging the projected pattern by means of said image sensor and optics, synchronised with the projection of the pattern during at least one observation window within said time window, said pixel sensors being in a false status when no light is detected by the corresponding photodetector, and in a true status when light is detected by the corresponding photodetector thereby obtaining a first binary matrix of pixels representing the field of view;
  - c) separating the projected pattern from an ambient light noise on the binary matrix of pixels by considering only pixels in the true status having at least one neighbour pixel also in the true status on the matrix of pixel obtained in one observation or a combination of the at least two observations within said time window thereby obtaining a second binary matrix of pixels representing the projected pattern;
  - d) based on triangulation between the light source position, the image sensor position and the second binary matrix of pixels, calculate the depth profile corresponding to the projected pattern; Triangulation can also be achieved between two or more instances of the image sensors using their relative positions and corresponding second binary matrices.
  - e) scan the projected pattern by repeating steps a to d on the entire field of view for determining the depth profile on the entire field of view;
- wherein each isolated element of the pattern is extending in the binary representation on at least two contiguous pixels,
- the method further comprises the steps of:
  - coding intensity and change of intensity data of impinging photons in the time-domain of each detector, and
  - decoding the intensity and change of intensity data by the neural network,
- the method further comprises the step of training said network to extract features of a set of input signals to said network.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention.

DESCRIPTION OF THE FIGURES

The disclosure will be further illustrated by means of the following description and the appended figures.

FIG. 7 shows an implementation of the image sensor (1) using a spiking neural network, according to embodiments of the present invention.

Figures 1, 2:
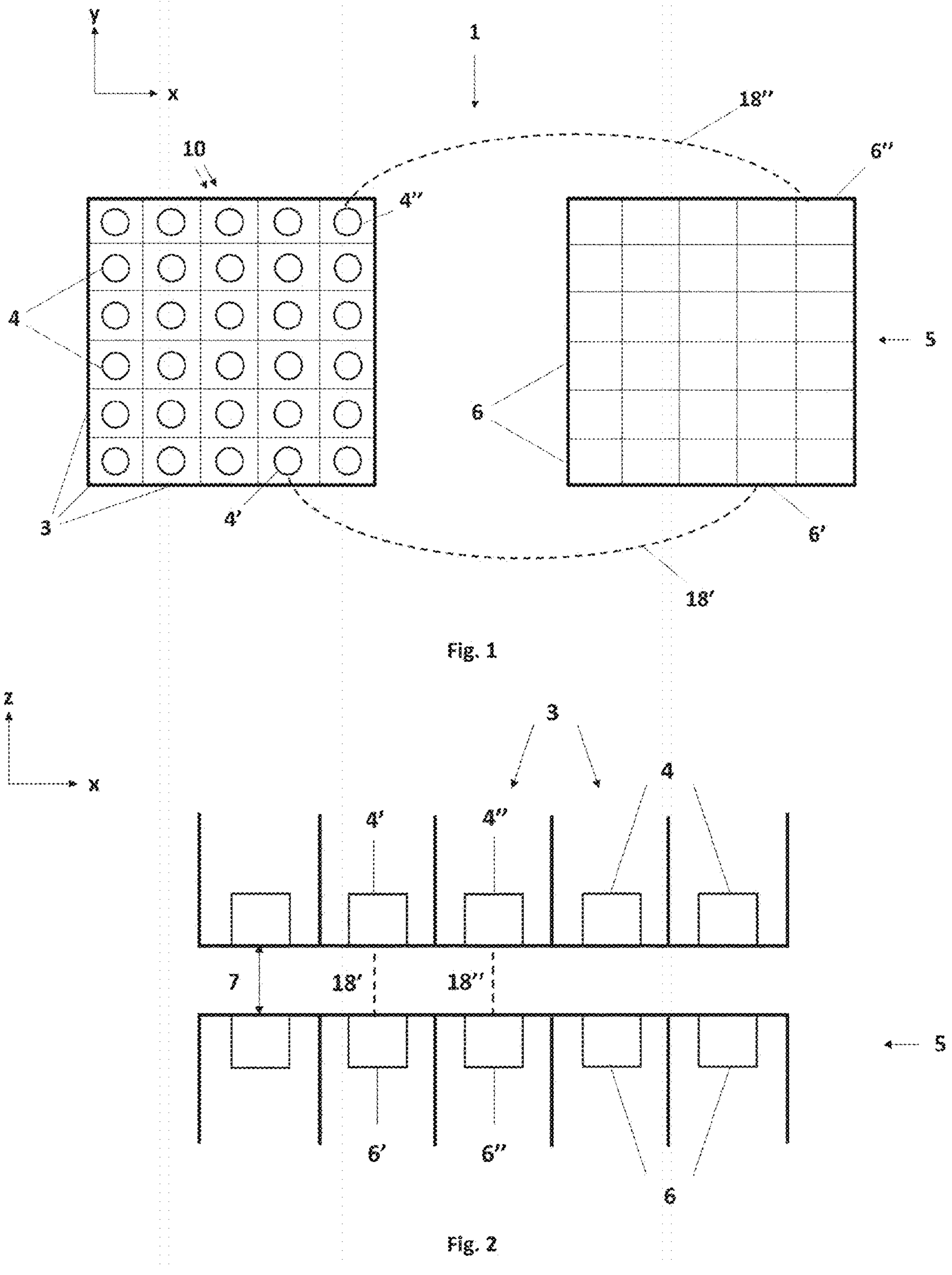
FIG. 1 shows a top view of an image sensor (1), comprising a neural network (5), according to embodiments of the present invention.
FIG. 2 shows a cross section of an image sensor (1) and a neural network (5), wherein each detector (4) is in the vicinity of at least one corresponding neuron (6), according to embodiments of the present invention. In case of a neural network with a certain depth, additional neurons from subsequent layers in the network may be present. The network (5) is thus not limited to only neurons corresponding to or interfacing with the image sensor (1).

Any reference signs in the claims shall not be construed as limiting the scope. In the different drawings, the same reference signs refer to the same or analogous elements.

DETAILED DESCRIPTION

The present invention relates to an image sensor for efficient image sensing.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In the description provided herein, numerous specific details are set forth. However, it is understood that embodiments of the invention may be practiced without these specific details. In other instances, well-known methods, structures and techniques have not been shown in detail in order not to obscure an understanding of this description.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a contaminant" refers to one or more than one contaminant.

The recitation of numerical ranges by endpoints includes all numbers and fractions subsumed within that range, as well as the recited endpoints.

In a first aspect, the present invention relates to an image sensor for efficient image sensing, according to claim 1.

The image sensor comprises a plurality of pixel sensors. Each pixel sensor comprises a photo detector adapted to output a logic signal (for example a train of '1's and '0', for example wherein '1' is a detection and '0' is absence of a detection). The image sensor further comprises processing means. The image sensor is characterized in that each photo detector is in the vicinity of said processing means. For example, in close proximity, such that the power consumption due to the distance between each photo detector and said means is reduced. This is advantageous in obtaining a compact sensor, and at the same time a sensor having minimal power losses, for example due to long connections or long and/or wide busses for data transmission or extremely high speed serialized link between different components (e.g. between each of said photo detector and said processing means). Such a distributed computing architecture is also much faster.

Said means is connected in parallel to each of detectors. For example, an output of each photo detector is received by (or fed to, or connected to) the processing means in parallel, for example said means have a plurality of input ports to receive said photo detector outputs. This is advantageous in processing data at the output of the pixel sensors (i.e. at the output of the photo detectors) simultaneously by the processing means (i.e. processing data in parallel). For example, the processing means comprises a plurality of processing elements, wherein each element is connected to one photo detector, in a parallel fashion. For example, for 1,000,000 pixel sensors, if 1 bit of data is available at the output of each pixel sensor (i.e. at the output of each photo detector), then 1,000,000 bits of data are inputted to the processing means and are processed at the same time at one instance. At another instance, another 1,000,000 bit of data are inputted to the processing means and are processed, and so on. This is advantageous in inputting and processing all this data efficiently and in a fast manner using the processing means.

Said processing means is preferably at least one neural network. However, the invention is not limited to the use of neural network. Different features of the invention throughout this document explained with reference to neural network can also be realized with a processing unit in a parallel distributed computing architecture as described above.

Said network comprises a plurality of neurons. The image sensor is characterized in that each photo detector is in the vicinity of at least one corresponding neuron. For example, in close proximity such that the power consumption due to the distance between each photo detector and the neuron is reduced. For example, each photo detector has one corresponding neuron thereto. For example, the distance between each photo detector and said neuron is a minimal distance e.g. they are as close as possible. This is advantageous in obtaining a compact sensor, and at the same time a sensor having minimal power losses. Said power losses may for example be due to long connections, or due to long and/or wide busses for data transmission or extremely high speed serialized link between different components (e.g. between said photo detector and said neuron).

The neural network processes sensing information from the plurality of photo detector. For example, the neural network replaces a conventional processor. This is advantageous in removing the need for a conventional processor, as well as removing the need for an analog-to-digital converter (ADCs) that is needed to convert analog data produced by the photo detector to digital data required by the processor. This is also advantageous in removing the need for a conventional random access memory (RAM), since neurons in the neural network may be able to store history, at least temporarily, for example the state of the neuron is influenced by previous states thereof. All of these components (conventional processor, conventional RAM, and ADCs) and the connections thereof, and any signal conversions in between, are eliminated, which increases the efficiency of the image sensor.

The neural network is also particularly advantageous in processing sensing information at a faster rate than of that of a conventional processor, with much lower power consumption. For example, a conventional processor needs to process all incoming sensing data e.g. logic '1' as well as logic '0', while said neural network may only needs to process logic '1' data, gating further processing of '0' data. For example, a conventional processor would consume power when repeatedly processing logic '0' data, especially at a high frame rate, while processing '0' data is not needed in the present invention since the absence of information does not require further processing.

Each photo detector is connected to the at least one corresponding neuron. For example, an output of each photo detector is received by (or fed to, or connected to) the at least one corresponding neuron. This is advantageous in processing data at the output of the pixel sensors (i.e. at the output of the photo detectors) simultaneously by the corresponding neurons (i.e. processing data in parallel). For example, for 1,000,000 pixel sensors, if 1 bit of data is available at the output of each pixel sensor (i.e. at the output of each photo detector), then 1,000,000 bits of data are inputted to the neural network and are processed at the same time at one instance. At another instance, another 1,000,000 bit of data are inputted to the neural network and are processed, and so on. This is advantageous in inputting and processing all this data efficiently and in a fast manner using the network.

It is not obvious to eliminate a conventional processor and other necessary components in such a sensor (e.g. ADC and a conventional RAM). Combining an image sensor to a neural network may lead to a mismatch between the output of the image sensor and the input to the neural network. This would prevent having the detectors in the vicinity of the neural network. The present invention is enabled by having a photo detector adapted to output a logic signal, which can produce an input (i.e. train of pulses) that is accepted by a neural network. In a preferred embodiment, said photo detector is a single-photon detector.

In a preferred embodiment, a synchronization element may be present between each of said photo detector and said corresponding neuron thereto (or between each photo detector and said processing means), such as for example a flip-flop. This allows converting asynchronous pulses or spikes (i.e. coming from said photo detectors) to a synchronous pulses or spikes (i.e. going into the neural network). This allows the invention to be carried out by different types of neural networks which may require synchronous operation or synchronized input data.

In a preferred embodiment, such a network mimics biological neural networks e.g. of a human's brain, for example such that information (e.g. visual input in the form of a digital image or a video sequence) are processed and analyzed in a similar way as in a human brain.

In a preferred embodiment, each pixel detector may produce a stream of pulses, whereby each pulse is the result of the detection of an impinging photon. The time interval between pulses is related to the intensity of the optical signal being detected. The higher the intensity for a given time window, the shorter the average time in between pulses. Of course, as is known by a person skilled in the art, the actual time between pulses follows a Poisson distribution wherein the average time is defined by the intensity of the optical signal.

In a preferred embodiment, the image sensor preferably operates between 100 nm and 10 micrometer, preferably between 100 nm and 1 micrometer. For example, each photo detector is able to detect photons impinging on said detector within a detection window falling within the range of 100 nm and 10 micrometer, preferably between 100 nm and 1 micrometer, even more preferable in an optical window defined by the wavelength of the light source being used. For instances one may build a sensing system with a light source with center wavelength at 850 nm, whereby the optical window for detection is also centered around the same wavelength.

In a preferred embodiment, the single photon detector may be a single-photon avalanche diode (SPAD). Such a diode acts as a photon quantizer, which removes the need for additional quantizers in the sensor. Additionally, such a diode allows intensity and change of intensity information of impinging photons to be coded in the time-domain information of the output of said diode. This is due to the nature of said output of said diode. Said output is stream of pulses, wherein each pulse corresponds to a detected photon on said diode. By setting observation windows that are equally spaced from each other, the average time delay or time difference between two output pulses (i.e. of the detector) depends on the intensity (e.g. optical power) of the impinging photons. For example, for an average of three detected photons in an observation window, the average time difference between the pulses of said detector is $\Delta T_1$. On the other hand, for an average of two detected photons in an observation window, the average time difference between the pulses of said detector is $\Delta T_2$, wherein $\Delta T_2 > \Delta T_1$. Therefore the intensity of impinging photons is higher for a lower $\Delta T$, and is lower for a higher $\Delta T$. Therefore, the intensity information (as well as change of intensity) of impinging photons on said diode are coded in the time-domain of said diode output. This may be de-coded using a conventional processor e.g. said processing means, or using a neural network. The neural network only needs to decode time-domain information in order to get intensity information of said impinging photons. In contrast, in case an ADC and a processor are used, said ADC would need to convert all analog data of each frame for all diodes in the sensor into the digital domain, after which the processor would need to process said data, for example record the intensity of said photon on said diode as well as count and accumulate said photons. This is a power intensive and a time consuming process, especially for higher frame rates, and especially for large number of photo detectors. Neural networks are exceptionally advantageous in decoding said time-domain information (in comparison to a conventional processor) due to their efficient and fast nature.

In a preferred embodiment, each photo detector may preferably be directly connected to the at least one corresponding neuron in said neural network (or to said processing means). For example, there are no intermediate components in between said detector and said network (or said processing means). For example, each detector is directly connected to its corresponding neuron (or to said processing means). This is advantageous in obtaining a power efficient sensor, since intermediate components e.g. quantizers that are power consuming, are avoided.

In a preferred embodiment, the distance between each detector and the corresponding neuron (or said processing means) thereto may be at most 100 micrometer, preferably at most 50 micrometer, more preferably at most 25 micrometer, and most preferably 10 micrometer. This is advantageous in obtaining a short and almost immediate connection between each detector and the corresponding neuron (or said processing means) thereof. For example, the connection is almost immediate, being e.g. only a metallic connection e.g. metallic pads on each of the detector and neuron (or said processing means), placed on top of each other (e.g. complementing each other, e.g. permanently joined with each other). For example, the thickness of the pads are the only separation between the detector and the corresponding neuron (or said processing means). For example, no wire connections are present. In a less preferred embodiment, the distance may also be at most 1000 micrometer or preferably at most 500 micrometer, for example by having a short connection between said detector and the corresponding neuron thereto (or said processing means).

In a preferred embodiment, the distance between each detector and its nearest neighbouring detector may be at most 20 micrometer, preferably at most 10 micrometer, more preferably at most 5 micrometer, most preferably at most 1 micrometer. Distances between each neuron and its nearest neighbouring neuron are similarly adapted.

In a preferred embodiment, the ratio between the distance between two neurons, and the distance between said detector and the corresponding neuron, may be between 1:1000 and 1:5, preferably between 1:100 and 1:10. This is similarly adapted in case the processing means is not a neural network.

In a preferred embodiment, each detector may be connected to (and corresponds to) the closest neuron thereof. However, the corresponding neuron for each detector may not be the closest, but may for example be the second closest, or the third closest.

In a preferred embodiment, the plurality of pixel sensors may be stacked on the plurality of neurons (or on the plurality of said processing elements of said processing means). For example, the pixel sensors are stacked such that each detector is stacked on its corresponding neuron, such that there is a minimum distance between said detector and said neuron. Stacking may refer to arranging the pixel sensors to be in close proximity to said neurons, for example to be arranged on top of each other, for example to be arranged to be facing each other. This allows the output of each detector to be readily available for inputting to the corresponding neuron. For example, such that there is only need for a connector with minimal length between said detector and said neuron, preferably without the need of a connector. This removes extra losses that would have been exhibited in bus connections between said detector and said neuron.

In a preferred embodiment, the connections between said pixel sensors and said neurons (or said processing elements of said processing means) may be fixed. For example, it is not easily possible to reconnect a pixel sensor to another neuron after stacking is completed. However, the weights of each neuron at the neural network are adjustable (configurable and reconfigurable). This allows the user to reconfigure the neural network without the need for disconnecting the pixel sensors from the corresponding neurons. Similarly, said processing elements may be re-configured.

In a preferred embodiment, there may be a misalignment between said pixel sensor and said neuron (or said processing means). Said misalignment is preferably at most 10 micrometer, more preferably at most 5 micrometer, even more preferably at most 2 micrometer, most preferably at most 1 micrometer, or sub-micrometer. Since the image sensor of the present invention may comprise 1,000,000 pixel sensors, the misalignment may be easily pushed down to less than 1 micrometer. This is done by aligning e.g. the top left and bottom rights corners of the image sensor using alignment markers, which would result in very high alignment accuracy.

In a preferred embodiment, the detectors may comprise a semiconductor, for example Silicon, Germanium, GaAs, InGaAs, InGaAsP, InAlGaAs, InAlGaP, InAsSbP, or the like. For example, the detector may comprise different layers of different semiconductors. The corresponding neurons may also comprise a semiconductor such as Silicon or Germanium, or the like. For example, the neural network may comprise different layers of different materials. The detectors and their corresponding neurons may be connected by two contact pads, for example comprising a conductive metal. For example, said conductive metal may be copper, gold, silver, nickel, aluminum, titanium, or preferably a combination thereof.

In a preferred embodiment, the detectors and the corresponding neurons may be on the same or on two different chips. In case of two different chips, the contact pads may for example be on both chips and are connected for example by stacking said two chips on top of each other.

In a preferred embodiment, each detector may be connected to the corresponding neuron (or to said processing means) through a conductive metallic connection e.g. metallic pads. For example, said pad is placed on each pixel sensor (i.e. each detector), and a complementing pad is placed on each corresponding neuron. For example, there are 1,000,000 pads on the 1,000,000 pixel sensors, and 1,000,000 pads on the corresponding 1,000,000 neurons to said pixel sensors. It is advantageous that each detector is in close proximity with its corresponding neuron, since this avoids additional losses due to any extra wire connections. For example, any additional losses due to any additional distance between each detector and its corresponding neuron would be multiplied by a factor of 1,000,000 (i.e. the same loss accumulated for each pixel sensor), which is avoided by the present invention.

In a preferred embodiment, said neuron may be capable of firing (i.e. producing or generating an output signal) based on an output of said detector. For example, when a detector detects a photon impinging thereon, the output of said detector is e.g. logic '1' or e.g. one pulse, wherein said neuron may fire based on e.g. at least one pulse of said detector. On the other hand, the neuron may not fire in case the at least one of said pulse is absent. This is advantageous in that data represented by absence of a detection does not need to be processed (that would be the case in a conventional processor, which processes also logic '0' data). This improves the power efficiency and speed of processing, and reduces the burdens of both memory and computation.

In a preferred embodiment, each neuron may be connected to at least one neighbouring neuron. Different neurons may be connected (e.g. via links) to each other. For example, two neighbouring neurons may be in close proximity to each other e.g. closer to each other than to other neurons. Each neuron may be capable of firing based on input signals from said at least one neighbouring neuron, as well as the output of said detector (i.e. corresponding detector). For example, in case of a false positive detection resulting in the output of said detector being logic "1" or resulting in a pulse, the input signal from said at least one neighbouring neuron may act as a confirmatory signal to determine whether this is a false or a true positive detection. This may reduce the noise and filter it out.

The definition of neighbouring neuron may not always be literal, for example, a neighbouring neuron may also be in the neighbourhood of another neuron, and not necessarily the closest neuron.

In a preferred embodiment, the neurons may also be connected to and receiving signals from non-neighbouring neurons, for example to determine whether a minimum number of detections in an image sensor is achieved, before determining whether a detection is a false positive or a true positive detection.

In a preferred embodiment, each detector may be arranged in a reverse biased configuration. The detector is capable of detecting single photons impinging thereon. The detector has an output for outputting an electrical detection signal upon detection of a photon. For example, a detection signal may be represented by a signal comprising logic '1' e.g. a detection, while no detection signal may be represented by a signal comprising logic '0' e.g. no detection. Alternatively, a detection signal may be represented by or result in a pulse signal, e.g. a transition from logic '0' to logic '1', then a transition back from logic '1' to logic '0', while no detection may be represented by (or result in) an absence of such a pulse signal.

In a preferred embodiment, the network may comprise at least one layer of neurons. Preferably, the network comprises an input layer of neurons, an output layer of neurons, and a plurality of intermediate layers in between the input and output layer (e.g. or at least one layer, preferably a plurality of layers) for processing data, for example to analyze data and extract features of objects in a scene.

In a preferred embodiment, each neuron in one layer may be connected to at least one neuron in the next layer, preferably to a plurality of neurons. For example, each detector is connected to at least one neuron at the input layer, preferably a plurality of neurons. For example, each neuron at the input layer is connected to at least one neuron in the second layer, preferably to a plurality of neurons in the second layer, and so on.

In a preferred embodiment, there may be 1,000,000 pixel sensors, and one corresponding neuron for each of said sensor (or one corresponding processing element for each of said sensor). Therefore, there may also be 1,000,000 neurons at the input layer of said network, connected by 1,000,000 connections to the 1,000,000 pixel sensors, wherein each neuron receives an output of one detector corresponding thereto. There may also be 1,000,000 neurons at the output layer of said network, as well as at least 1,000,000 neurons for each intermediate layer in between said input and output layers in said network.

In a preferred embodiment, said neural network may be trained to process data of said detector output. For example, said network may be trained to decode the time-domain information of said detector output. For example, said network may be trained to decode intensity and/or change of intensity information of impinging photons on said detector, using the time-domain information of said detector output. Processing the output of each of said detectors using the neural network is done at much faster rate and with much less power, compared to processing the output using a conventional processor.

In a preferred embodiment, said network may be trained to extract features of a set of input signals to said network, for example a combined set of input signals, for example at a predetermined instance. Said features may be mass, density, motion, and/or proximity of objects (e.g. proximity from one another, or from said detectors) in a scene, for example a scene to be analyzed and/or imaged. Other examples of features may be intensity values, contours, very high speed events, fluorescence life time imaging, and the like. For example, the detectors monitor at least one object, preferably a plurality of objects, in the scene, wherein photons impinging on said detectors are converted by said detectors to a train of pulses that is input into said network. Said network subsequently analyses said input and extracts said features, for example by applying a transformation on said input. Therefore, the network acts as an analysis module. Nevertheless, the neural network is also capable of reproducing an image of said scene. For example, an image representation module takes the output of said neural network and reproduces an image of the scene.

In a preferred embodiment, the neural network may be adapted to be responsive to a train of pulses (i.e. adapted to receive input of a train of pulses). This is particularly advantageous in processing sensing information at a faster rate than of that of a conventional processor, with much lower power consumption. For example, there is no need for converting the output of said detector to be accepted by said network. The neural network may for example be a spiking neural network or a pulse coupled neural network. In a preferred embodiment, the spiking neural network may be a spiking convolutional neural network (SCNN), or a spiking recurrent neural network (SRNN).

In a preferred embodiment, the neural network comprises a spiking neural network. Inputs provided at the input layer of said spiking network are typically a train of pulses or spikes. For example, each neuron in the input layer receives a series of spikes as input (e.g. from at least one corresponding detector output). These input spikes are transmitted across different layers. The outputs at the output layer are also typically a train of pulses or spikes.

In a preferred embodiment, in said spiking neural network, there may be at least one of three types of connections between said neurons. Said connections may be feed-forward connections (i.e. from the input to the output layer, through the intermediate layers). Said connections may alternatively be negative lateral connections, or reciprocal connections.

In a preferred embodiment, each neuron in the spiking neural network may operate as an integrate-and-fire neuron. The neurons of said network may have a threshold value at which they fire. For example, said neurons may only fire at the moment of threshold crossing. When a neuron's potential reaches the threshold, the neuron fires, and generates a signal that travels to other neurons which, in turn, increase or decrease their potentials in response to this signal. Therefore, spikes push the potential of neurons to higher or lower values, until the potential in said neurons either decay or fire. After firing, the neuron's potential is reset to a lower value. This is advantageous in reducing power consumption, since a signal will only be generated when there is a sufficiently strong change in incident photons (e.g. determined by a predetermined number of photons impinging on a pixel sensor). This causes the network to consume less power and to suppress activity in some portions thereof. For example, a neuron would not fire in case only one photon is incident on the corresponding detector, or, for example a neuron would not fire in case only one or only few photons (less than the predetermined number of photons needed to overcome the threshold value) is incident on a group of corresponding detectors. The network furthermore helps to reduce and/or eliminate the adding of zeroes when computing the weighted sum of inputs to each neuron. This reduction in data traffic translates into reduced power consumption, and increasing the speed of processing.

In a preferred embodiment, said neuron may only fire if the amount of time since the last output is larger than a refractory period. This is advantageous in avoiding a neuron to fire too frequently when it is overstimulated.

In a preferred embodiment, each neuron in the spiking neural network may operate as a leaky-integrate-and-fire neuron. The neurons of said network may have a threshold value at which they fire, similarly to the integrate-and-fire neuron. However, the neurons may have a leakage mechanism. For example, the neuron's potential decreases over time. This is advantageous in allowing the neuron to fire only when there is significant and persistent increase in its potential, for example such that an increase due to noise would decay over time.

In a preferred embodiment, the neural network may be a pulse-coupled neural network. In said network, each neuron is connected to and receiving input signals from the detector of the corresponding pixel sensor, as well as the neighbouring neurons. Each neuron in the pulse-coupled neural network has a linking compartment and a feeding compartment. The linking compartment receives and sums up the input signals from the neighbouring neurons. The feeding compartment receives and sums up the input signals from the neighbouring neurons as well as the input signals from the detector of the corresponding pixel sensor. The output of both compartments is multiplied, and fed to a threshold compartment. The neuron fires when the input to the threshold compartment is more than the threshold value. It is particularly advantageous that each of the linking compartment, feeding compartment, and threshold compartment have a feedback mechanism (i.e. the output depends on the previous outputs). This is advantageous in keeping history of the previous states of the neuron, as well as of its neighbouring neurons. Due to the feedback mechanism, the threshold value is dynamic. This is advantageous in obtaining a robust sensor against noise, as well as a sensor capable of bridging minor intensity variations in input patterns.

In a preferred embodiment, single-photon avalanche diodes are advantageous since they are compatible with neural networks responsive to a train of pulses, for example spiking neural networks and pulse coupled neural networks. For example, the coded intensity and change of intensity information at the output of said diodes are suitable as an input to said neural networks, wherein said network is able to be decode said intensity information.

In a preferred embodiment, each neuron in the neural network, is capable of producing an output based on current inputs to said neuron as well as current state of said neuron. The current state of each neuron corresponds to previous inputs to and previous states of said neuron. These may also be influenced by inputs from other neurons, and therefore also states of these neighbouring neurons. Therefore, each neuron is capable of storing (e.g. at least temporarily) and comparing data of different detection instances, and conclude therefrom the trajectory of a moving object. For example, knowing the trajectory of a moving object moving in front of said plurality of pixel sensor and detected by some of its detectors at instances T1, T2, and T3, would facilitate the neuron to determine a possible upcoming detection at a next instance T4, for example the neuron would be able to predict which detectors (e.g. among the nearby detectors) is likely to detect impinging photons at said next instance. A spiking neural network is particularly advantageous for achieving this, since the output of each neuron is determined by current state of the neuron (determined by previous inputs to said neuron), in combination with current inputs (e.g. in this case from detectors). This allows the network and each neuron to keep history and to have a memory-like behavior, so as to be able to compare detections at different instances, in order to facilitate determining the next output of each neuron. This also reduces the noise and makes it easier to filter out noisy detections (e.g. false positive detections), since the neural network may predict that such a detection has a higher chance of occurring.

In a preferred embodiment, the image sensor may comprise at least one type of neural network. Alternatively, the image sensor may comprise different neural networks, of the same or different types.

In a preferred embodiment, the pixel sensors and the corresponding neurons may be arranged in a plurality of rows and/or a plurality of columns. For example, the pixel sensors and the corresponding neurons may be arranged in a matrix configuration. The corresponding neurons (i.e. being at the input layer of the neural network) are preferably configured in the same or similar configuration to the detectors of the pixel sensors. The intermediate layers as well as the output layer of the neural network may be configured in a different configuration. Such arrangement allows detection of a larger area, and allows each neuron to have neighbouring neurons.

In a preferred embodiment, the image sensor may comprise more than 100 pixel sensors, preferably more than 1,000 pixel sensors, more preferably more than 10,000 pixel sensors, even more preferably more than 100,000 pixel sensors, most preferably more than 1,000,000 pixel sensors. For example, the image sensor may be arranged in a matrix fashion, wherein said image sensor comprises 1,000 pixel sensor rows and 1,000 pixel sensor columns.

In a preferred embodiment, the image sensor may be movable. For example, the orientation of the image sensor may be changed in any of x, y, or z directions. For example, it is possible to obtain 3D vision with only one image sensor.

In a preferred embodiment, the image sensor may be used for 3D vision applications. For example, the image sensor may be used to visualize objects in a three dimensions. Alternatively, said sensor may allow analyzing the scene, for example by extracting features of objects in the scene, without necessarily producing an image of said scene.

In a second aspect, the present invention relates to an optical sensing system according to claim 8, comprising an image sensor according to the first aspect. The optical sensing system further comprises optics able to produce an image of a scene on said image sensor. For example, said means are connected to the neural network, for example to the output of the neural network. For example, an image of a scene may be reproduced by said optics, for example locations of points of objects in the scene may be reproduced by said optics. Said optics may use the neural network as an array of integrators to reproduce said image information. For example, optical input signals for each pixel sensor creating logical output signals by each pixel sensors can be accumulated and aggregated to be able to generate an image.

In a preferred embodiment, the system may further comprise at least one light source. For example, the light source is adapted to be in a wavelength detectable by the pixel sensors. For example, between 100 nanometer and 10 micrometer, preferably between 100 nanometer and 1 micrometer. A light source is advantageous in allowing triangulation. For example, using a system comprising a light source illuminated on a scene (e.g. an environment) and two of said image sensors e.g. oriented differently than each other, wherein said two sensors have a shared field of view of the scene, it is possible to convert x-y-time data of the two sensors to x-y-z-time data by triangulation. For example, by adapting said light source to illuminate a dot on said scene in an illumination trace, wherein said light source comprises means adapted to scan said dot on said scene (preferably continuously), wherein said image sensors monitor said dot and output locations of points of at least one object (e.g. points of surfaces of said object) in said scene along said trace at a plurality of instances, wherein the x-y-time data of the two image sensors can be converted to x-y-z-time data using triangulation, for example using said neural network. The light source may act for example as a reference point, such that said locations of said points of said object of the first image sensor can be synchronized with those of the second image sensor, to create the z-dimension.

The light source may be illuminating and scanning a scene to be imaged in a Lissajous fashion or pattern. This illumination trajectory is advantageous in allowing efficient and fast image detection, since after several illumination cycles, a significant part of the image is already illuminated. Other illumination patterns may be envisaged.

In a preferred embodiment, the system may further comprise a plurality of image sensors and/or a plurality of light sources. This is advantageous in creating 3D vision. For example, each image sensor may be oriented differently, such that a 3D perception of the scene to be imaged is captured, for example by triangulating the output of two such image sensors.

In a preferred embodiment, the system may comprise image representation means, for example a screen-like or other image representation devices, so as to reproduce locations of points of said objects in said scene.

In a third aspect, the present invention relates to a method for extracting features of a scene using the optical sensing system according to the second aspect. The method comprises the steps of adapting said neural network to receive a train of pulses, for example adapting each neuron to receive a train of pulses produced by the corresponding photo detector thereto.

The method further comprises the step of adjusting an activation level or potential of a neuron based on said train of pulses. For example, for each pulse received by a neuron, the activation level of potential of said neuron increases. Said activation level represents the intensity of impinging photons on photo detectors corresponding to said neurons.

The method further comprises the step of adapting a neuron to fire (i.e. produce an output signal) once said activation level exceeds a threshold value. The method further comprises the step of propagating said output signal to at least one neuron in a subsequent layer of said neural network. The method may further comprise the step of propagating said output signal to at least one neighbouring neuron.

The method further comprises the step of extracting features of output signals of said network. For example, extracting features of output signals of the output layer of said network.

In a preferred embodiment, the method may further comprise the step of determining the depth profile of a field of view (e.g. said scene). Said determining step comprises the following steps:

a) projecting by means of a projector (e.g. said light source) at least one light pattern onto the field of view, the projection occurring in a time window of less than 10 μsec, preferably less than 1 μsec;
b) imaging the projected pattern by means of a camera sensor (e.g. said image sensor) and optics, synchronised with the projection of the pattern during at least one observation window within said time window, said camera sensor comprising a matrix of pixels (e.g. said pixel sensors), each comprising a photodetector, said pixels being in a false status when no light is detected by the corresponding photodetector, and in a true status when light is detected by the corresponding photodetector thereby obtaining a first binary matrix of pixels representing the field of view;
c) separating the projected pattern from an ambient light noise on the binary matrix of pixels by considering only pixels in the true status having at least one neighbour pixel also in the true status on the matrix of pixel obtained in one observation or a combination of the at least two observations within said time window thereby obtaining a second binary matrix of pixels representing the projected pattern;
d) based on triangulation between the projector position, the camera position and the second binary matrix of pixel calculate the depth profile corresponding to the projected pattern;
e) scan the projected pattern by repeating steps a to d on the entire field of view for determining the depth profile on the entire field of view;

wherein each isolated element of the pattern is extending in the binary representation on at least two contiguous pixels.

In a preferred embodiment, the method may further comprise the step of training said network to extract features of a set of input signals to said network. For example, for optical input signals to said network, wherein said signals are a train of pulses. Said features may comprise mass, density, motion, and/or proximity of at least one object in a scene. The method may further comprise the step of applying transformation on said input signals.

In a preferred embodiment, the method may further comprise the step of coding intensity and change of intensity of impinging photons in the time-domain of said detector output. For example, using single photon avalanche diode to code intensity and change of intensity of impinging photons. The method may further comprise the step of training said neural network for decoding the intensity and change of intensity data. The method may further comprise the step of decoding said intensity and change of intensity data.

Any feature of the third aspect (method) may be as correspondingly described in the first aspect (sensor) and second aspect (system).

In a fourth aspect, the present invention relates to an image sensor for efficient image sensing.

The sensor comprises a plurality of pixel sensors, each pixel sensor comprising a photo detector. The sensor further comprises a processing unit, capable of identifying detections of each of said pixel sensors. Preferably, said processing unit is replaced by said neural network of the first aspect of the present invention (or said processing elements of said processing means of the first aspect of the present invention), and wherein each pixel sensor and photodetector thereof is connected to a corresponding neuron, as described in the first aspect.

The sensor is characterized in that said unit is capable of identifying detections connected (or semi-connected) or exhibiting a specific pattern in space over consecutive time steps. For example, wherein detections of each pixel sensor are at least two detections over at least two consecutive time steps, wherein said at least two detections correspond to at least one pixel sensor, or at least one pixel sensor and one immediate neighbouring pixel sensor to said pixel sensor. For example, each pixel sensor has a plurality of immediate neighbouring pixel sensors. For example, said two detections are connected in space across consecutive time steps e.g. being detected at one detection point or at neighbouring detection points over consecutive time steps.

For example, at a first time step, said detection point may shift from a pixel sensor to a first immediate neighbouring pixel sensor, and at a second consecutive time step, said detection point may shift to a second immediate neighbouring pixel sensor of said first neighbouring pixel sensor. Alternatively, said detection point may not shift to another detection point, but instead remain on the same detection point.

This is advantageous in determining consistent detections, for example detections are not random, for example detections that are have a certain pattern. Since the sampling of said pixel sensors is fast enough, a consistent detection of an object defined by a point is either detected by one pixel sensor over at least two consecutive time steps i.e. in case said object didn't move between said two time steps, or is detected by the immediate neighbouring pixel sensor. For example, wherein said dot detection does not skip one pixel sensor while moving between a first time instance and a second time instance. This is further advantageous in allowing to filter out random detections that are likely false positive detections e.g. ambient and thermal noise.

Said neural network is particularly advantageous for replacing said processing unit, for example so as to be able to filter out noisy detections. This is because said neural network is able to process the information e.g. filter out noisy detections in a fast and power efficient manner. Moreover the network can be trained to find patterns of a more complex nature, beyond what could be described using more traditional rule-based processing.

In a preferred embodiment, said detections further correspond to at least one non-immediate neighbouring pixel sensor to said pixel sensor, wherein at most one pixel sensor is between each pixel sensor and said non-immediate neighbouring pixel sensor, preferably at most two pixel sensors.

This is a design choice, based on the sampling rate of said pixel sensors. For example, in case the sampling rate is not high enough, such that objects moving fast can skip one or two pixel sensors. In this case, the detection between said pixel sensor and said non-immediate pixel sensor may be interpolated.

In a preferred embodiment, the sampling rate of each pixel sensor is at least 1 MHZ, preferably at least 10 MHz, more preferably at least 100 MHz. This is advantageous since objects do not move very fast in comparison to the sampling rate of the detector. For example, the sensors have a time resolution of at least 1 microsecond, preferably at least 100 nanoseconds, more preferably at least 10 nanoseconds.

In a preferred embodiment, said unit is capable of calculating a trajectory along said pixel sensors. Said trajectory describes movement of a dot in a scene. Said dot can be generalized to an object moving in a scene, wherein said object is defined by a plurality of dots. For example, calculating a trajectory of points defining said moving objects, for example between a first and a second consecutive time instances. For example, points having a spatially consistent trajectory within said time steps. Said trajectory allows to filter out points that are off said trajectory, since it is likely that such points are noisy detections. Said trajectory may be a line trajectory, however it may also be circular or semi-circular, or any other trajectory.

In a preferred embodiment, said unit is capable of extrapolating upcoming detections based on said trajectory. For example, determining points with the highest likelihood of occurring, based on said trajectory. For example, by assuming that an object or pattern moves along a fixed trajectory. Said extrapolating requires at least two point detections and a trajectory defined by said two points, however said extrapolating is more accurate based on more than two points, for example five points over five time steps, for example ten points over ten times steps. For example, an object moving to the right direction along the x-axis between a first instance T1 and a tenth instance T10, said object has chances of continuing to move in the same direction at an eleventh instance T11 and further time instances. Preferably, said unit is capable of validating an extrapolated detection. For example so as to check whether the trajectory of said object has changed, for example by validating after each predetermined time steps, for example after each two or three time steps. Said extrapolation is advantageous in allowing to obtain a faster sensor, for example by allowing to calculate or predict a possible upcoming detection before actually being detected. This would also allow to reduce the power consumption since less detections may be needed to find out a movement of an object in said scene.

In a preferred embodiment, the unit is capable of grouping points moving along a similar or the same trajectory, for example points defining one object. For example, the processing unit may define a contour based on said grouped points. This allows to filter out points that are not defining said object or that are off said contour, for example false positive detections.

In a preferred embodiment, said sensor further comprises at least one memory element, wherein said element is capable of storing said detections. For example, said detections are stored, at least temporarily, on said memory element, and then retrieved by said unit for processing e.g. for filtering out false positive detections, calculating said trajectory, or extrapolating said upcoming detections. Said memory element may be replaced by said neural network. For example, wherein said neural network is capable of replacing the function of both said processing unit and said memory element, for example so as to be able to store data in order to be filtered out of noisy detections. For example, wherein one neuron of said network corresponds to one pixel sensor.

In a preferred embodiment, different regions of said neural networks, for example different groups of neurons, may process data of corresponding pixel sensors to said neurons. For example, identifying a trajectory of a moving detection along a region of interest.

In a fifth aspect, the present invention relates to a method for optical sensing. Said method comprises the step of determining a first detection at a first detection point at a first time step. The method further comprises the step of determining a second detection at a second detection point at a second time step consecutive to said first time step. The method is characterized in that the method further comprises the step of identifying said first and second detection for which said first and second detection points are connected (or semi-connected) in space over said first and second time steps. For example, wherein said first and second detection points are the same point or immediate neighbouring points.

In a preferred embodiment, said method further comprises the step of filtering out detections that are not connected in space over said first and second time steps. For example, wherein said first and second detection points are neither the same point nor immediate neighbouring points. In a preferred embodiment, said method further comprises the step of calculating a trajectory of said first and second detection. For example, a trajectory that describes the movement of said detection from one to another detection point, for example caused by a dot moving in a scene, for example an object defined by a number of dots moving in a scene.

In a preferred embodiment, said method further comprises the step of filtering out detections off said trajectory. This is advantageous in filtering out noisy detections, caused for example by thermal and ambient noise. Preferably, said method may further comprise the step of extrapolating an upcoming detection based on said trajectory.

Any feature of the fifth aspect (method) may be as correspondingly described in the fourth aspect (sensor). Furthermore, any feature of the fifth and fourth aspects may be as correspondingly described in the first (sensor) and second aspect (system). For example, the neural network of the first aspect is particularly advantageous for the sensor of the fourth aspect. Therefore, all features of the neural network in the first aspect may be combined with the sensor of the fourth aspect.

In a sixth aspect, the present invention relates to use of a sensor according to the first aspect and/or a device according to the second aspect and/or a method according to the third aspect and/or a sensor according to the fourth aspect and/or a method according to the fifth aspect, for optical sensing, preferably for efficient optical sensing.

Further characteristics and advantages of embodiments of the present invention will be described with reference to the figures. It should be noted that the invention is not restricted to the specific embodiments shown in these figures or described in the examples, but is only limited by the claims.

FIG. 1 shows a top view of an image sensor (1). The image sensor (1) comprises a plurality of pixel sensors (3), and each pixel sensor (3) comprises a single photon detector (4). The image sensor (1) further comprises a neural network (5), wherein said network (5) comprising a plurality of neurons (6). Each detector (4) receives photons (10) impinging thereon, and generates a corresponding signal based thereon. For example, an electrical pulse is generated by each detector (4) after detecting one photon (10). Each detector (4) is then connected with a corresponding neuron, for example detector (4') and neuron (6'), or detector (4") and neuron (6"), wherein the detectors (e.g. 4' and 4") and their corresponding neurons (e.g. 6' and 6") are placed in a corresponding location, such that the connections are neat and minimal. For example, detector (4') and neuron (6') are connected by connection (18'), and similarly detector (4") and neuron (6") are connected by connection (18").

FIG. 2 shows a cross section of an image sensor (1) and a neural network (5). Each detector (4) is in the vicinity of and connected to one corresponding neuron (6). For example, detector (4') is in the vicinity of and connected to neuron (6') via connection (18'), and similarly detector (4") is in the vicinity of and connected to neuron (6") via connection (18"). Each detector (4) and its corresponding neuron (6) are distanced by a distance (7) from each other.

Figure 3:
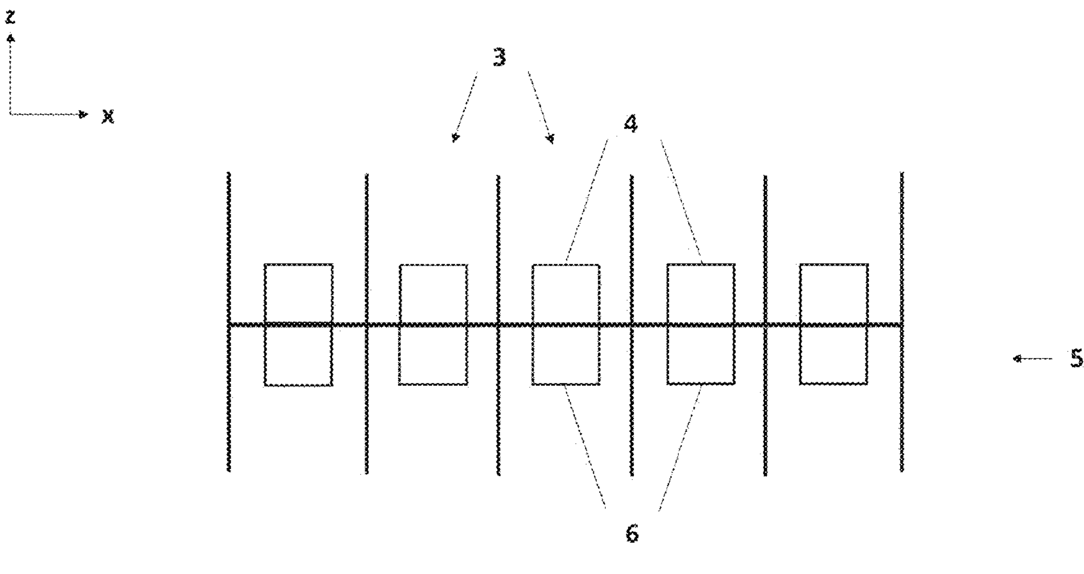
FIG. 3 shows a cross section of an image sensor (1) and a neural network (5), wherein the detectors (4) of the pixel sensors (3) are stacked on the neurons (6), according to embodiments of the present invention, and whereby there is physical connection between pixel sensor layer and neuron layer including electrical connections between each pixel sensor (3) and corresponding interfacing neuron (6). The physical connection may be obtained through wafer to wafer bonding, whereby the electrical connections are created using Cu-Cu connections Local pixel circuits for controlling and/or biasing the detectors as well as pre-conditioning or processing of the detector signals may be present in the pixel sensor layer. To reduce the manufacturing complexity of the pixel sensor layer, such circuitry may be partly or completely implemented in the neural network layer (5). For instances one can avoid the processing steps required to make an MOS transistor if all circuitry using MOS transistors is implemented on the neural network layer.

FIG. 3 shows a cross section of an image sensor (1) and a neural network (5), wherein the detectors (4) of the pixel sensors (3) are stacked on the neurons (6). For example, the distance (7) is zero, or very close to zero, since the connections (20', 20") are eliminated. For example, the distance (7) is equal to the thickness of the contact pads (not shown).

Figure 4:
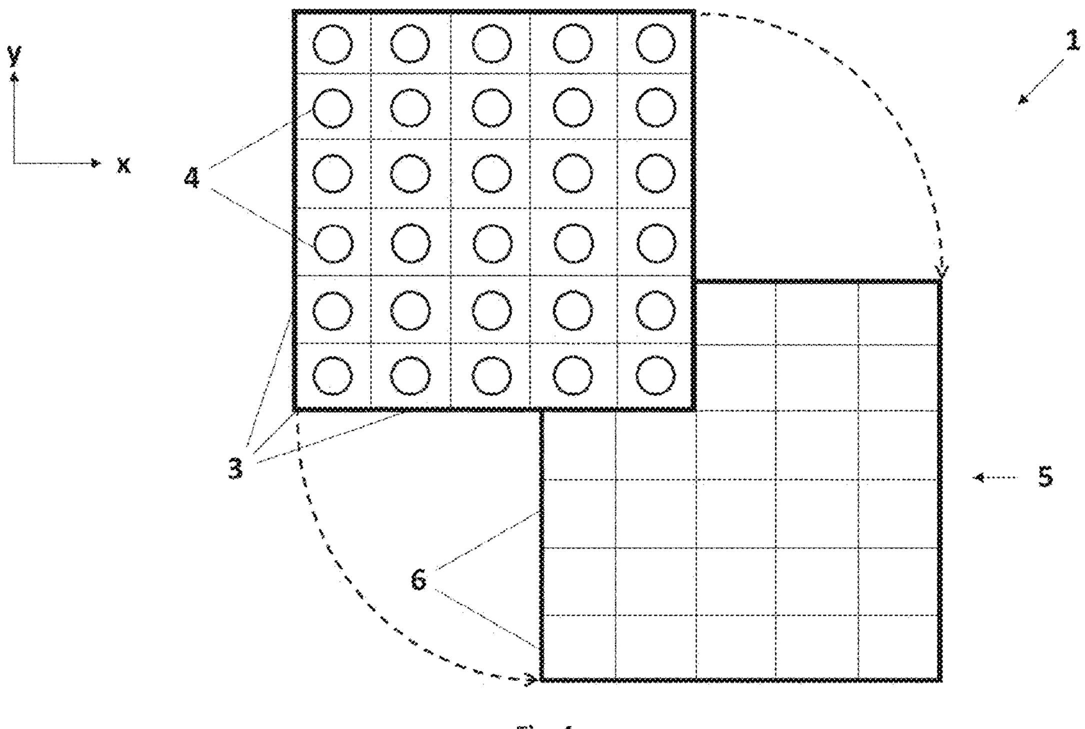
FIG. 4 shows a top view of an image sensor (1) and a neural network (5), wherein the detectors (4) of the pixel sensors (3) are to be stacked on the neurons (6), according to embodiments of the present invention.

FIG. 4 shows a top view of an image sensor (1) and a neural network (5), wherein the detectors (4) of the pixel sensors (3) are to be stacked on the neurons (6). For example, each detector (4) is staked on the corresponding neuron (6) thereof. Such stacking is done carefully so as to obtain minimal alignment error.

Figures 5, 6:
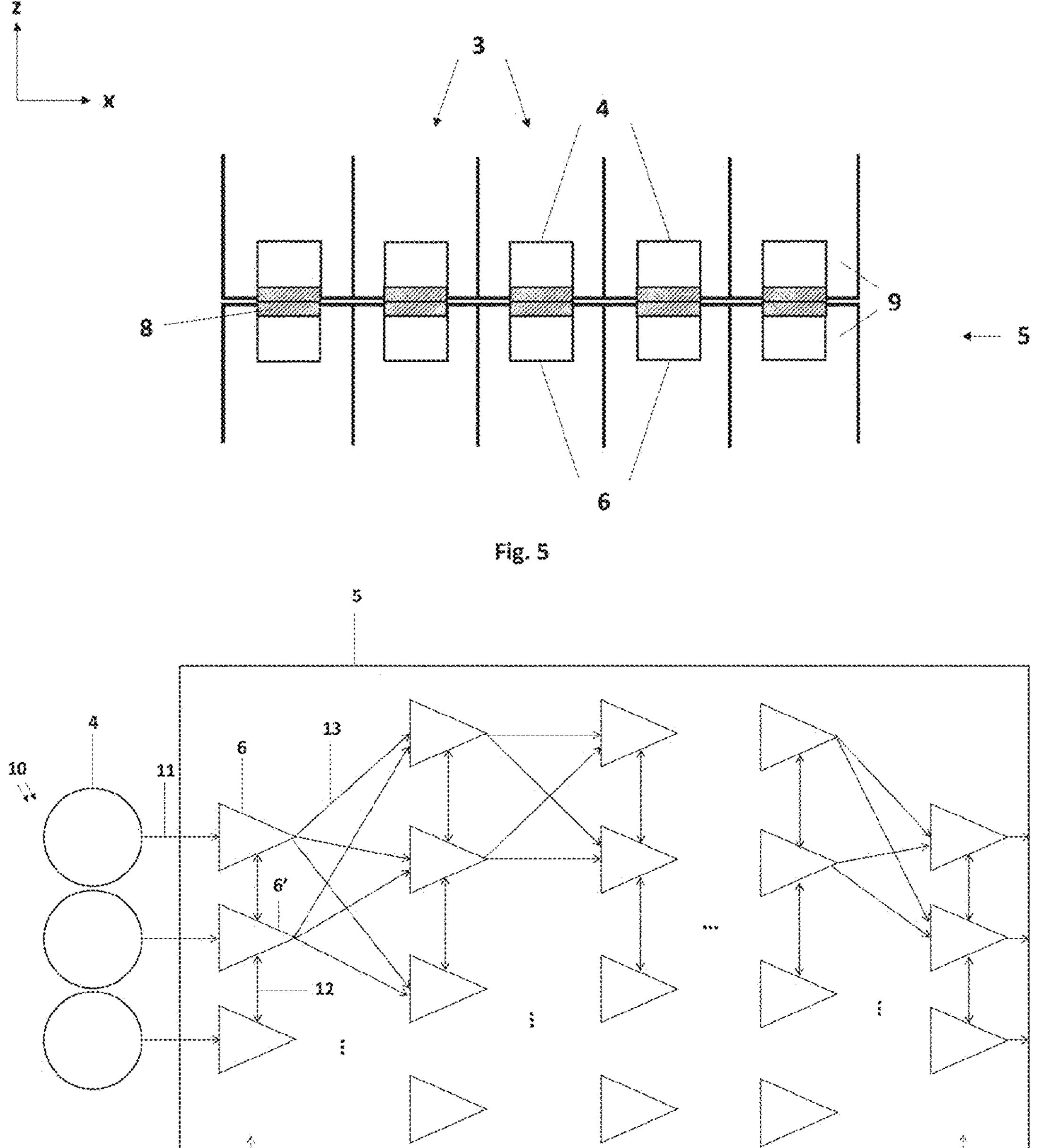
FIG. 5 shows a cross section of an image sensor (1) and a neural network (5), wherein at least 1 contact pad (8) for each of the detectors (4) and the neurons (6) are stacked on each other, according to embodiments of the present invention.
FIG. 6 shows a plurality of detectors (4) feeding neurons (6) in a neural network (5), according to embodiments of the present invention.

FIG. 5 shows a cross section of an image sensor (1) and a neural network (5), wherein a contact pad (8) of each of the detectors (4) and the neurons (6) are stacked on each other. The contact pads (8) are made of a conductive metallic material, while the neurons and detectors are made of a semiconductor material (9). The distance (7) between each detector (4) and the corresponding neuron (6) may be only the thickness of the contact pad (8). The pads are compatible to be stacked on each other, for example they are complementary in shape. The pads may also be permanently stacked on each other, such that no further movement of the image sensor (1) with respect to the neural network (5) is allowed.

FIG. 6 shows a plurality of detectors (4) feeding neurons (6) in a neural network (5). The photons (10) impinging on each detector (4) result in a detector output (11), which is input into each corresponding neuron. In this case, each detector has one corresponding neuron (6). The neural network can be split into three layers, an input layer (14), an intermediate layer (15), and an output layer (16). The input layer (14) comprises neurons (6) that accept the detector output (11) as an input thereto. The intermediate layer (15) comprises neurons that process the input (11) to the input layer (14). The output layer (16) comprises neurons that output the final output of the neural network (5). Each neuron may be connected to the neighbouring neurons, for example neuron (6) and (6'), via an input signal (12). Said input signal (12) of the neighbouring neurons allows neurons to communicate with neighbouring neurons thereof, so as to achieve a more accurate detection, for example to reduce the number of false positive detections and filter out the noise. Each neuron in one layer is connected to at least one neuron in the next layer, preferably to more than one neuron in the next layer. The number of neurons, connections, and layers shown in FIG. 6 is just for illustration purposes, and may be different in reality.

FIG. 7 shows an implementation of the sensor (1) using spiking neural network. For example, when detectors (4) in said sensor (1) detect an object or detected pattern moving in a trajectory (17) at a time T=T1, to T=T2, then T=T3, as shown in the figure, the neural network (5) may predict the next detection point wherein the object is present, based on said trajectory (17). This facilitates the detection of said object. This may be done by neurons getting input from their neighbouring neurons, acting as feedback information. For example, if a neuron knows (through neighbouring neurons) that a neuron which is 10 neurons away is firing, followed by another neuron which is 9 neurons away and then 8 neurons away, it may be able to predict when would it fire. This also reduces the noise, since the neural network may predict that such a detection has a higher chance of occurring.

Furthermore, other than predicting the next detection point, said trajectory allows to identify consistent movement of said object, which allows to filter out noisy detections.

Figure 8:
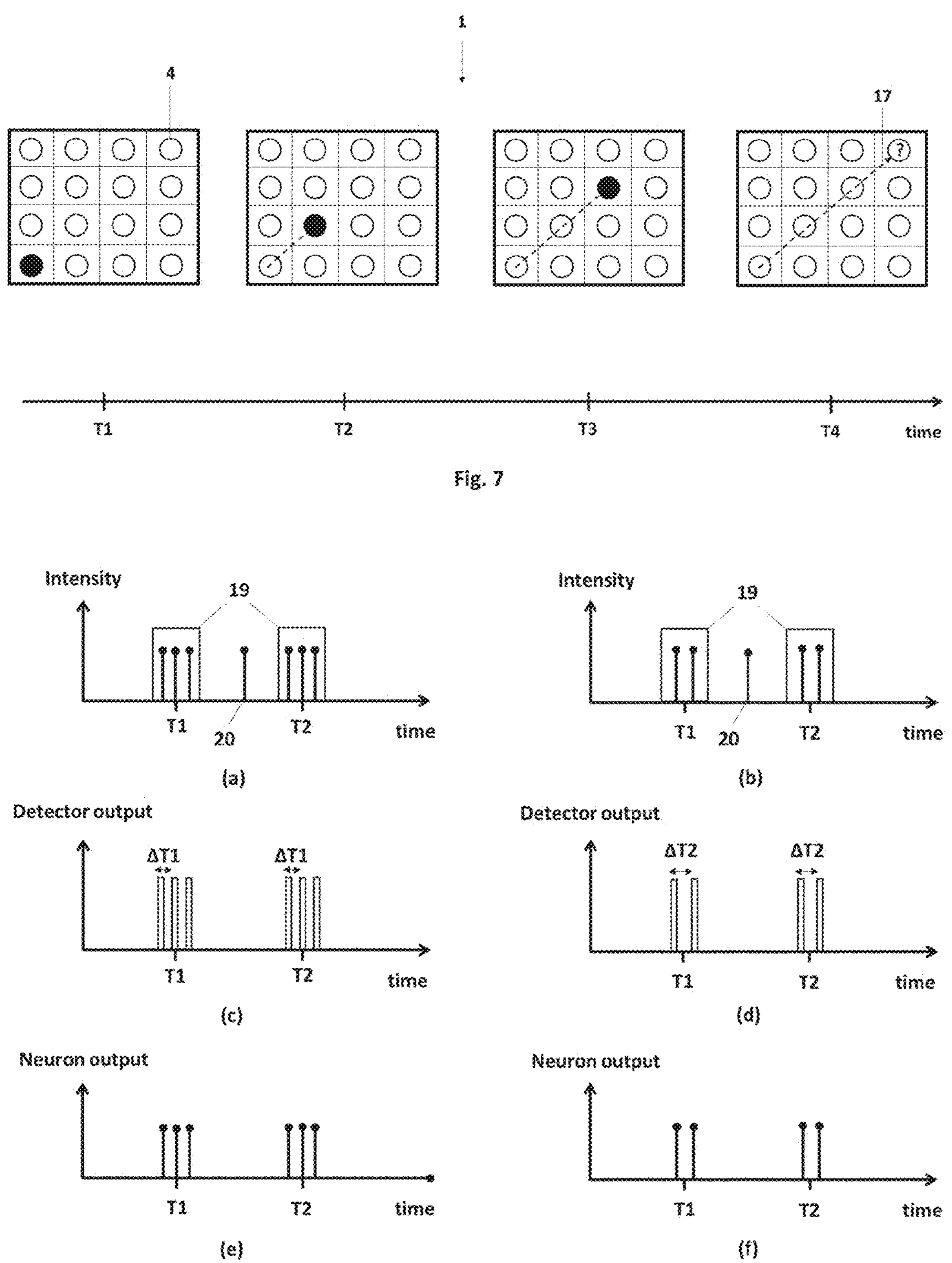
FIG. 8 shows coding and decoding intensity of impinging photons on said pixel sensor (3), according to embodiments of the present invention.

FIG. 8 shows coding and decoding intensity of impinging photons on said pixel sensor (3). Coding of said intensity is done using SPADs, while decoding is done using the neural network (5). By setting observation windows (19) that are equally spaced from each other, the chance of detecting noise (20) at said windows (19) is reduced, while the chance of detecting impinging photons remains the same. Two examples are provided in FIG. 8. In the first example, FIG. 8 (*a*) shows a train of impinging photons on a SPAD. The detector (4) generates the train of pulses shown in FIG. 8 (*c*), wherein the average time difference between the pulses is ΔT1, wherein ΔT1 corresponds to the intensity of the impinging photons. In the second example, FIG. 8 (*b*) shows another train of impinging photons, wherein the detector (4) generates the train of pulses shown in FIG. 8 (*d*). The average time difference between the pulses is ΔT2, wherein ΔT2 corresponds to the intensity of the impinging photons. As shown in FIG. 8 (c, d), ΔT2>ΔT1 since the intensity detected in FIG. 8 (*b*) is lower than that in FIG. 8 (*a*). The neural network would be able to reconstruct the intensity levels based on said time difference between pulses, as shown in FIG. 8 (*e, f*).

Figure 9:
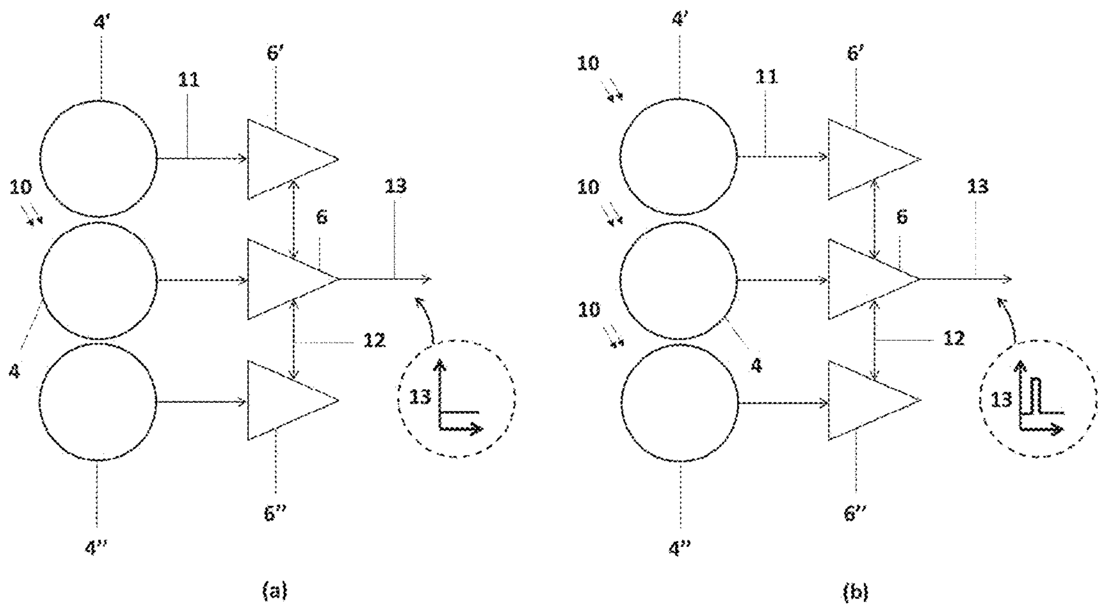
FIG. 9 shows the reduction of thermal and ambient noise in the detector output (11) using the neural network (5), according to embodiments of the present invention.

FIG. 9 shows the reduction of thermal and ambient noise in the detector output (11), using the neural network (5). Two examples are provided in FIG. 9 (*a, b*). In FIG. 9 (*a*), the detector (4) detects an incident photon (10). The neuron (6) corresponding to the detector (4) determines whether this detection is a true or a false detection. This is based on history of said neuron (6), and based on input signals (12) from neighbouring neurons (6', 6"). In this case, this is a false detection. FIG. 9 (*b*), on the other hand, shows a true detection, wherein neighbouring neurons (6', 6") (and their detectors (4', 4")) provide an indication to said neuron (6) that this is a true detection, and therefore a pulse is generated by said neuron (6). The operation is simplified in FIG. 9, wherein in a real network a pulse is not always generated at the detector output (13) after each incident photon on said detector (4). In a real network, a pulse is only generated once a threshold of detections during a certain time period in a neuron (e.g. (6)) is reached.

Figure 10:
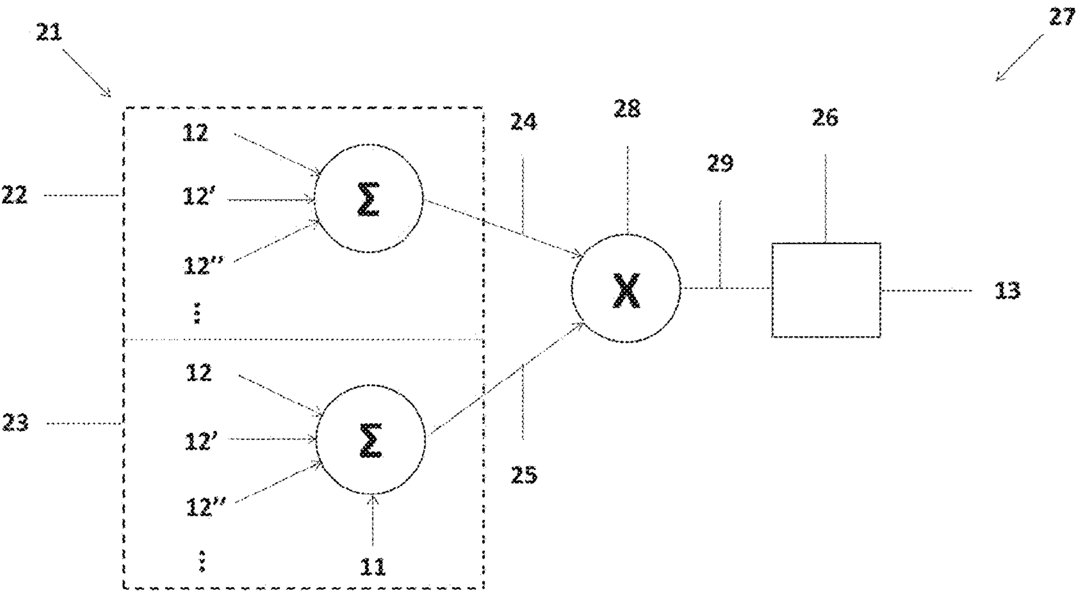
FIG. 10 shows the operation of a neuron in a pulse-coupled neural network (27), according to embodiments of the present invention.

FIG. 10 shows the operation of a neuron in a pulse-coupled neural network (27). A receptive field compartment (21) receives input signals into the neuron. These signals may be input signals from neighbouring neurons (12, 12', 12"). Alternatively, these signals may be stimulation input signals (11) to the neuron from another layer (e.g. a previous layer) or an output signal from a detector in case said neuron was in the input layer (14) of the neural network (5). In the receptive field compartment (21), the compartment that receives neighbouring neurons input signals (12, 12', 2") is referred to as linking compartment (22), while the compartment that receives input signals from both neighbouring neurons and stimulation input signals (11) is referred to as feeding compartment (23). The neighbouring neurons input signals (12, 12', 12") in the linking compartment (22) are summed together, and similarly the neighbouring neurons input signals (12, 12', 12") with the stimulation input signals (11) in the feeding compartment (23). The output signal of the linking compartment (24) and the feeding compartment (25) are then multiplied using a multiplier (28), after which the output (29) of said multiplier (28) is fed to a threshold compartment (26). Each of the linking compartment (22), the feeding compartment (23), and the threshold compartment (26), have a feedback mechanism (not shown), such that each compartment retains its previous state but with a decay factor. Therefore each compartment have a memory of the previous state, which decays in time. The neuron fires i.e. an output of the threshold compartment (13) is generated in case the input to the threshold compartment is more than the threshold value. The threshold value, however, changes over time, due to the feedback mechanism. After the neuron fires, the threshold value is significantly increased, after which it decays over time until the neuron fires again.

Figure 11:
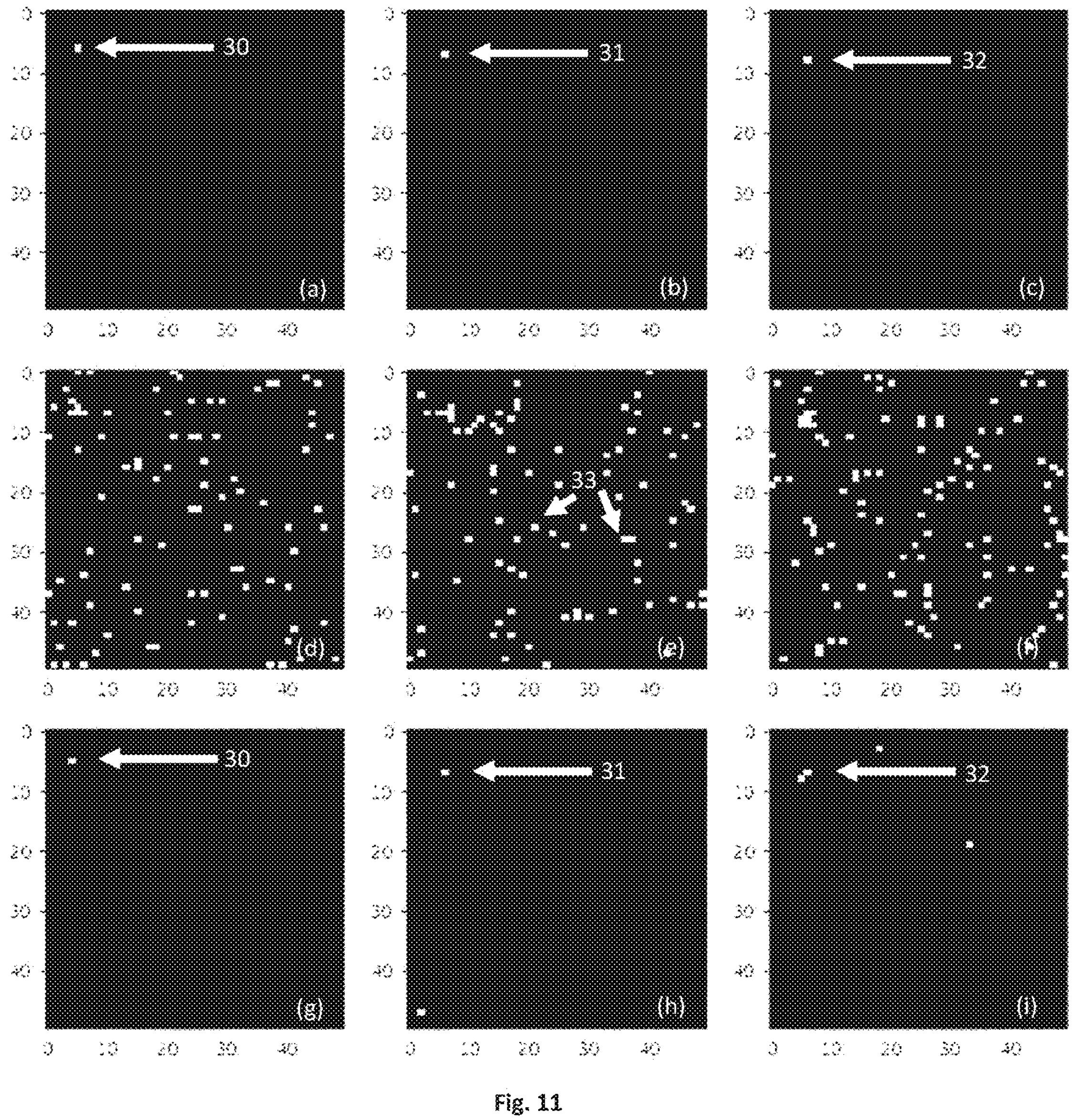
FIG. 11 shows three consecutive input signals from an array of pixel sensors, wherein (a, b, c) is an ideal case detection without ambient and thermal noise, (d, e, f) is a realistic case detection with ambient and thermal noise, and (g, h, i) is a filtered output, according to embodiments of the present invention.

FIG. 11 shows in (*a, b, c*) three consecutive input signals from an array of pixel sensors, showing an object or pattern moving between a first position (30), a second position (31), and a third position (32). This is assuming that said dot moves no more than one pixel between in one time step. FIG. 11 (*a, b, c*) is an ideal case detection, without taking into account ambient of thermal noise. FIG. 11 shows in (*d, e, f*) realistic three consecutive input signals from the array of pixel sensors, taking into account ambient and thermal noise, for example such as in (33). FIG. 11 shows in (*g, h, i*) the filtered output by the processing means, preferably a neural network, of each of the input signals. The processing means, preferably a neural network, is capable of filtering the ambient and thermal noise such as in (33), by checking the consistency of movement of said object, for example, an object moving in a consistent manner in a certain direction. Furthermore, optionally, the neural network is capable of predicting movement of said object at a later time instance, based on said consistent movement.

Figures 12, 13:
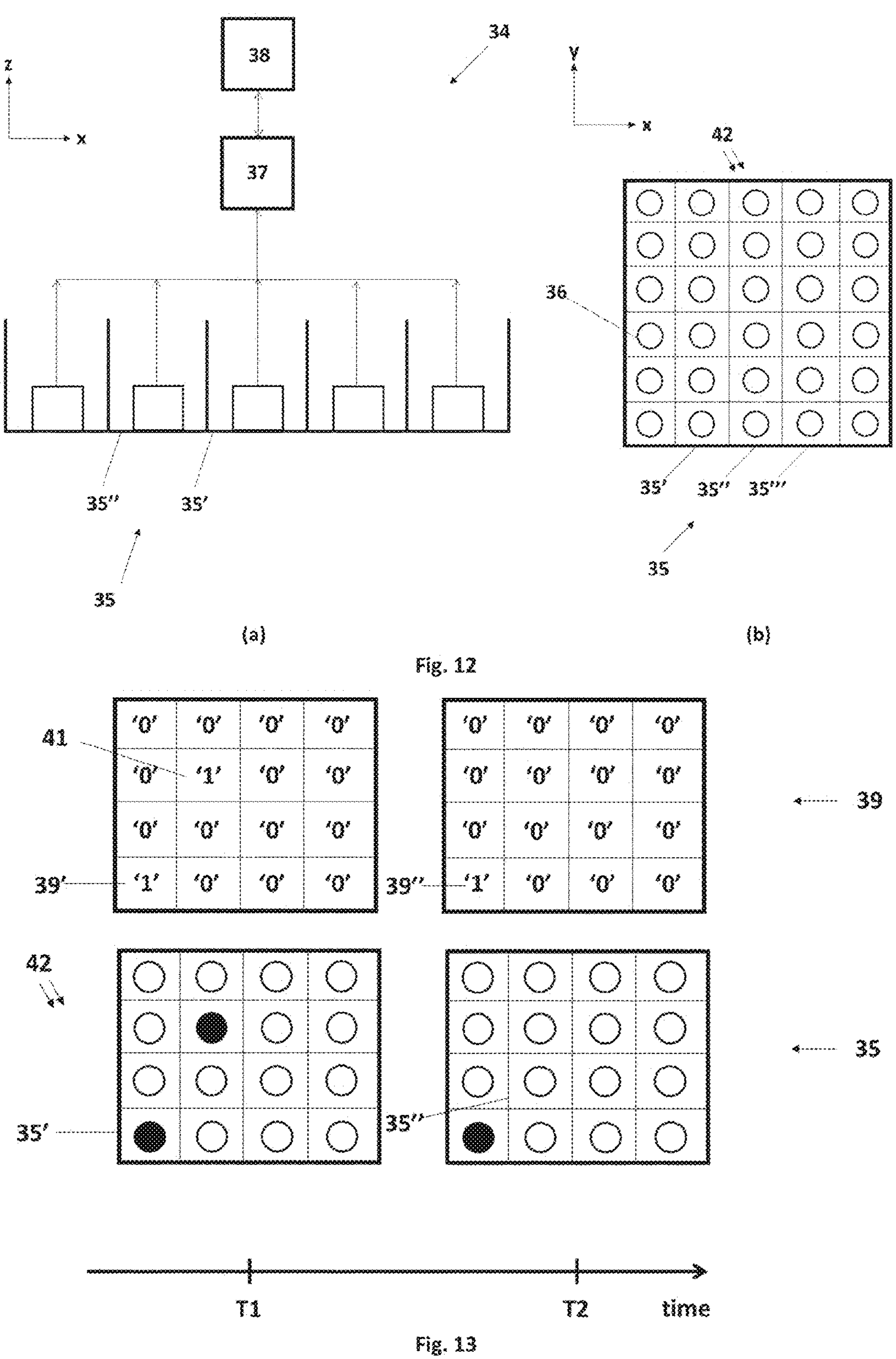
FIG. 12 shows in (a) a cross sectional view of an image sensor (34) comprising a plurality of pixel sensors (35), a processing unit (38), and a memory element (37), and in (b) a top view of said plurality of pixel sensors (35) in a matrix configuration, according to embodiments of the present invention.
FIG. 13 shows said plurality of pixel sensors (35) in a matrix configuration, and detections (39) thereof, wherein two detections (39', 39'') occur in two consecutive time steps (T1, T2) in one pixel sensor (35'), according to embodiments of the present invention.

FIG. 12 (*a*) shows a cross sectional view of an image sensor (34) comprising a plurality of pixel sensors (35), each pixel sensor (35) comprising a photo detector (36). The sensor (34) further comprises at least one memory element (37). Each photo detector (36) is connected to the memory element (37) to store the output of the detection (39', 39") of each of said photo detectors (36) at different time instances. The sensor (34) further comprises a processing unit (38). The processing unit (38) is able to retrieve the stored data on said memory element (37). The unit (38) is also capable of performing other operations such as extrapolation, calculating a trajectory of detections . . . etc., as described above.

FIG. 12 (*b*) shows a top view of said sensor (34), wherein said pixel sensors (35) are arranged in a matrix configuration, for example having a plurality of pixel sensor rows and columns. Each detector (36) detects photons (42) impinging thereon, and generates a corresponding signal based thereon. For example, an electrical pulse is generated by each detector (36) after detecting one photon (42). Each pixel sensor (35') has a plurality of immediate neighbouring pixel sensors, for example (35"), as well as non-immediate neighbouring pixel sensors, such as (35").

FIG. 13 shows a matrix of pixel sensors (35) and detections (39) thereof, wherein two detections (39', 39") occur in two consecutive time steps (T1, T2), in one pixel sensor (35'). Said detections (39', 39") are considered to be consistent detections, since they occurred within two consecutive time steps (T1, T2) at the same pixel sensor (35'). Therefore, they are not considered to be a noisy detection, unlike (41).

Figures 14, 15:
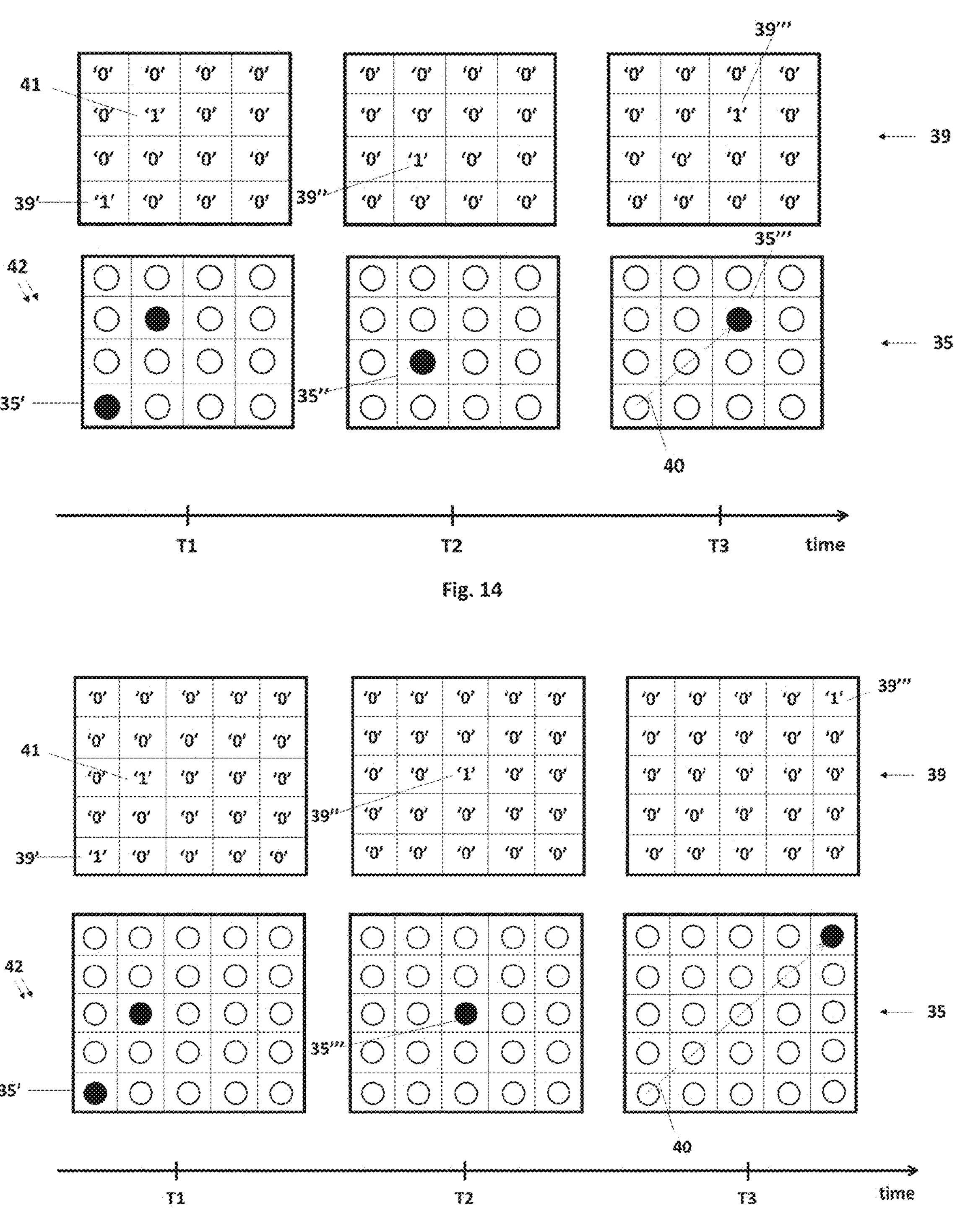
FIG. 14 shows a said plurality of pixel sensors (35) in a matrix configuration, and detections (39) thereof, wherein two detections (39', 39'') occur in two consecutive time steps (T1, T2) in two immediate neighbouring pixel sensors (35', 35''), wherein an upcoming detection (39''') at an upcoming time instance (T3) is extrapolated, according to embodiments of the present invention.
FIG. 15 shows said plurality of pixel sensors (35) in a matrix configuration, and detections (39) thereof, wherein two detections (39', 39'') occur in two consecutive time steps (T1, T2) in two non-immediate neighbouring pixel sensors (35', 35'''), wherein an upcoming detection (39''') at an upcoming time instance (T3) is extrapolated, according to embodiments of the present invention.

FIG. 14 shows a matrix of pixel sensors (35) and detections (39) thereof, wherein two detections (39', 39") occur in two consecutive time steps (T1, T2), in two immediate neighbouring pixel sensors (35', 35"). Said detections are considered to be consistent detections, unlike the noisy (i.e. false positive) detection in (41), since they occurred within two consecutive time steps (T1, T2) in two immediate neighbouring pixel sensors (35', 35"). Based on said two detections (39', 39"), a trajectory (40) of detections may be calculated by said unit (38). Based on said trajectory (40), the noisy detection (41) can be filtered out. Furthermore, based on said trajectory (40), an upcoming detection (39'") at an upcoming time instance (T3) may be extrapolated. This allows to predict detections before occurring. For example, a trajectory of a moving object. The object moving in front of the sensor (34) is in this case a simple point moving in a line trajectory (40). In real life however, said object is more complex, as will be shown in the next figures.

FIG. 15 shows a matrix of pixel sensors (35) and detections (39) thereof, wherein two detections (39', 39") occur in two consecutive time steps (T1, T2) in two non-immediate neighbouring pixel sensors (35', 35'"). Based on the design choice, for example based on the sampling rate of each pixel sensor, detections that skip one pixel sensor may be considered consistent. For example, in case the movement of objects were faster than the sampling rate of said pixel sensors. This is an alternative to the operation in FIG. 3. Based on said two detections (39', 39"), a trajectory (40) can be calculated, so as to filter out noisy detections (41), and extrapolate upcoming detections (39'").

Figure 16:
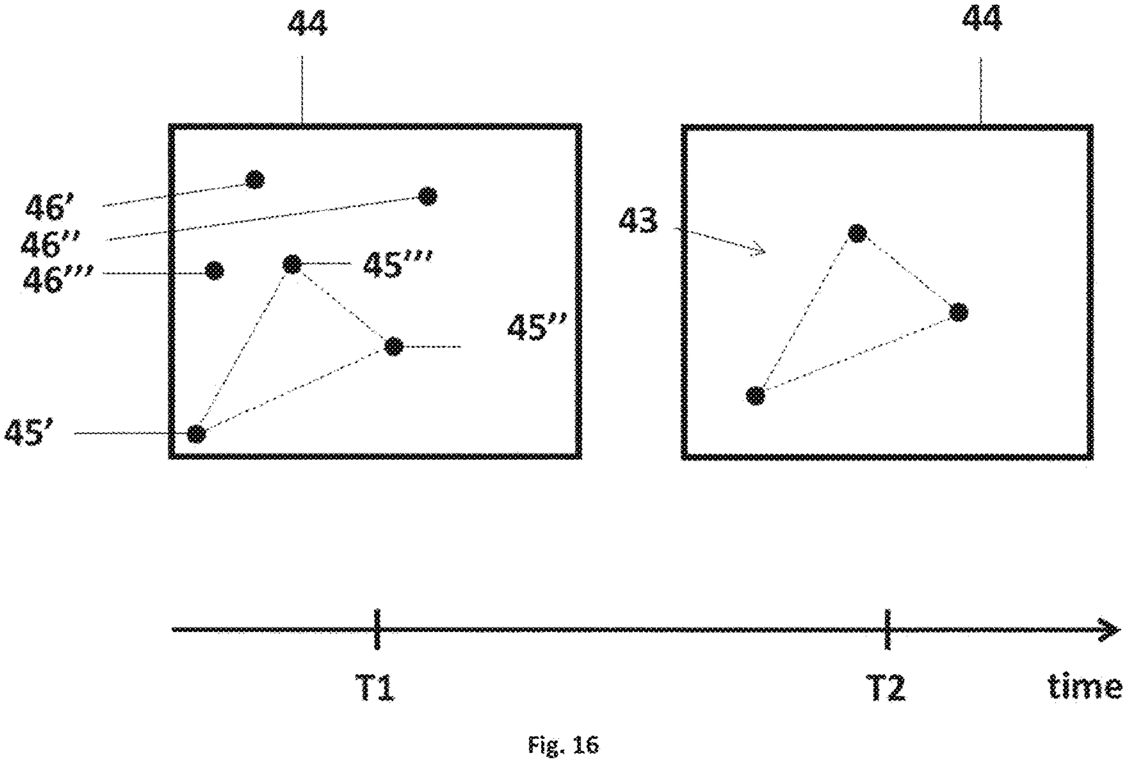
FIG. 16 shows an example of a triangular-shaped object (43) moving in a scene (44) between a first and a second consecutive time instances (T1, T2), according to embodiments of the present invention.

FIG. 16 shows an example of a triangular-shaped object (43) moving in a scene (44) between a first and a second consecutive time instances (T1, T2). For simplicity, the object (43) is defined by three detection points (45', 45", 45"), wherein each of said three detection points (45', 45", 45'") is assumed to have moved by one pixel between the first and second time instances (T1, T2). This allows to filter out any other noisy detections around said triangle, such as (46', 46", 46'"). Other arrangements for accomplishing the objectives of the methods and devices embodying the invention will be obvious for those skilled in the art.

The proceeding description gives details of certain embodiments of the present invention. It will, however, be clear that no matter how detailed the above turns out to be in text, the invention may be applied in many ways. It should be noted that the use of certain terminology when describing certain characteristics or aspects of the invention should not be interpreted as implying that the terminology herein is defined again to be restricted to specific characteristics or aspects of the invention to which this terminology is coupled.

LIST OF REFERENCE SIGNS

1 Image sensor
3 Pixel sensor
4 Single photon detector
5 Neural network
6 Neuron
7 Distance
8 Contact pad
9 Silicon
10 Incident photons
11 Detector output or neuron input
12 Input signal of a neighbouring neuron
13 Neuron output
14 Input layer
15 Intermediate layer
16 Output layer
17 Trajectory of a moving object
18 Connection between a detector and a neuron
19 Observation window
20 Noise
21 Receptive field
22 Linking compartment
23 Feeding compartment
24 Output of linking compartment
25 Output of feeding compartment
26 Threshold compartment
27 Neuron of a pulse-coupled neural network
28 Multiplier
29 Output of multiplier
30 First position
31 Second position
32 Third position
33 Noise
T1 First time step
T2 Second time step
T3 Upcoming time step
34 image sensor
35 Plurality of pixel sensors
35' Pixel sensor
35" Immediate neighbouring pixel sensor
35" Non-immediate neighbouring pixel sensor
36 Photo detector
37 Memory element
38 Processing unit
39 Detections
39' First detection
39" Second detection
39999 Upcoming detection
40 Trajectory
41 Noisy detections
42 Photons
43 Triangular-shaped object
44 Scene
45', 45", 45" Three detection points
46', 46", 46" Three noisy detection points

The invention claimed is:

1. An image sensor for efficient optical sensing, comprising:

a plurality of pixel sensors, each pixel sensor comprising a photo detector, and being adapted to output a logic signal, and processor, wherein the processor is at least one neural network, comprising at least one layer of neurons, each photo detector is stacked on at least one neuron corresponding thereto of the layer, wherein each photo detector is connected in parallel to the at least one neuron corresponding thereto of the layer, characterized in that the photo detector is a single-photon detector and that each neuron is adapted to receive a train of pulses, wherein each neuron is connected to at least one neighboring neuron, wherein each neuron is capable of producing an output based on input signals from the at least one neighboring neuron and the output of the detector, wherein the neural network is capable of:

identifying detections connected or semi-connected or exhibiting a specific pattern in space over consecutive time steps, or identifying at least two neighboring detections over one time step.

2. An image sensor of claim 1, wherein each neuron is capable of producing an output based on current inputs to the neuron as well as current state of the neuron.

3. An image sensor of claim 1, wherein the neural network is a spiking neural network.

4. An image sensor of claim 1, wherein a distance between each detector and the processor is at most 100 micrometers.

5. The image sensor of claim 4, wherein the distance between each detector and the processor is at most 50 micrometers.

6. An optical sensing system comprising an image sensor of claim 1 and optics able to produce an image of a scene on the image sensor.

7. An optical sensing system of claim 6, wherein the system further comprises at least one light source, wherein the at least one light source is adapted to illuminate a dot on a scene, wherein at least one light source is adapted to scan the dot on the scene.

8. The optical sensing system of claim 7, wherein the at least one light source is adapted to scan the dot on the scene continuously.

9. An optical sensing system of claim 6, wherein the network is trained to extract features of a set of input signals to the network.

10. A method for extracting features of a scene using the optical sensing system of claim 6, comprising the steps of:

adapting the neural network to receive a train of pulses, adjusting an activation level of a neuron after receiving each pulse by the neuron, adapting the neuron to produce an output signal once the activation level exceeds a threshold value, propagating the output signal to at least one neuron in a subsequent layer of the network, and extracting features of output signals of the network.

11. A method of claim 10, wherein the method further comprises the step of determining the depth profile of a field of view, the determining step comprises the steps of:

projecting by the light source at least one light pattern onto the field of view, the projection occurring in a time window of less than 10 μsec;

imaging the projected pattern by the image sensor and optics, synchronized with the projection of the pattern during at least one observation window within the time window, the pixel sensors being in a false status when no light is detected by the corresponding photodetector, and in a true status when light is detected by the corresponding photodetector thereby obtaining a first binary matrix of pixels representing the field of view;

separating the projected pattern from an ambient light noise on the binary matrix of pixels by considering only pixels in the true status having at least one neighboring pixel also in the true status on the matrix of pixel obtained in one observation or a combination of the at least two observations within the time window thereby obtaining a second binary matrix of pixels representing the projected pattern;

based on triangulation between the light source position, the image sensor position and the second binary matrix of pixels, calculating the depth profile corresponding to the projected pattern;

scanning the projected pattern by repeating the projecting, imaging, separating, and calculating steps on the entire field of view for determining the depth profile on the entire field of view;

wherein each isolated element of the pattern is extending in the binary representation on at least two contiguous pixels.

12. The method of claim 11, wherein the project occurs in a time window of less than 1 μsec.

13. A method of claim 10, wherein the method further comprises the steps of:

coding intensity and change of intensity data of impinging photons in the time-domain of each detector, and decoding the intensity and change of intensity data by the neural network.

14. The image sensor of claim 1, wherein each photodetector is directly connected to the at least one neuron corresponding thereto.

15. The image sensor of claim 1, wherein the single-photon detector is a single-photon avalanche diode.

* * * * *